US010122429B2

(12) United States Patent
Damnjanovic et al.

(10) Patent No.: US 10,122,429 B2
(45) Date of Patent: Nov. 6, 2018

(54) CHANNEL STATE INFORMATION FOR ENHANCED CARRIER AGGREGATION

(71) Applicant: QUALCOMM Incorporated, San Diego, CA (US)

(72) Inventors: Jelena Damnjanovic, Del Mar, CA (US); Wanshi Chen, San Diego, CA (US); Peter Gaal, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 14/995,453

(22) Filed: Jan. 14, 2016

(65) Prior Publication Data

US 2016/0211903 A1 Jul. 21, 2016

Related U.S. Application Data

(60) Provisional application No. 62/110,288, filed on Jan. 30, 2015, provisional application No. 62/104,659, filed on Jan. 16, 2015.

(51) Int. Cl.
*H04W 4/00* (2018.01)
*H04B 7/06* (2006.01)
(Continued)

(52) U.S. Cl.
CPC .......... *H04B 7/0626* (2013.01); *H04L 5/001* (2013.01); *H04L 5/0057* (2013.01); *H04W 24/10* (2013.01);
(Continued)

(58) Field of Classification Search
CPC ..... H04B 7/0626; H04L 5/001; H04L 5/0057; H04W 72/0453; H04W 72/0413; H04W 24/10
(Continued)

(56) References Cited

U.S. PATENT DOCUMENTS 9,369,922 B2 * 6/2016 Han .................. H04W 28/12
9,806,866 B2 * 10/2017 Hoshino ............. H04L 5/0053
(Continued)

FOREIGN PATENT DOCUMENTS

WO WO 2016120827 A2 * 8/2016 .......... H04L 1/0026

OTHER PUBLICATIONS

ISA/EPO, International Search Report and Written Opinion of the International Searching Authority, Int'l App. No. PCT/US2016/013666, dated Mar. 31, 2016, European Patent Office, Rijswijk, NL, 11 pgs.

*Primary Examiner* — Thai D Hoang
(74) *Attorney, Agent, or Firm* — Holland & Hart LLP

(57) ABSTRACT

Methods, systems, and devices are described for wireless communication in a system that supports enhanced carrier aggregation (eCA). An eCA configuration with a large number of component carriers (CCs) may include CCs grouped into channel state information (CSI) reporting groups. Channel state reports for the CCs in each group may be reported together. In some cases, individual CC reports may be multiplexed into a single report, and in other cases a single channel state report may contain information related to each CC in the group. The combined reports may be transmitted over an uplink control channel or an uplink data channel, or both. Collisions between reports may be resolved based on the reporting type of the groups or the serving cell indices of the CCs in the group.

23 Claims, 18 Drawing Sheets

(51) Int. Cl.
*H04W 24/10* (2009.01)
*H04W 72/04* (2009.01)
*H04L 5/00* (2006.01)

(52) U.S. Cl.
CPC ... *H04W 72/0413* (2013.01); *H04W 72/0453* (2013.01)

(58) Field of Classification Search
USPC ............... 370/329–330, 335–338, 341–345
See application file for complete search history.

(56) References Cited

U.S. PATENT DOCUMENTS

| | | | |
|---|---|---|---|
| 2010/0234037 A1* | 9/2010 | Terry | H04L 1/0023 455/450 |
| 2011/0319068 A1 | 12/2011 | Kim et al. | |
| 2012/0127869 A1* | 5/2012 | Yin | H04L 1/0031 370/252 |
| 2013/0039231 A1* | 2/2013 | Wang | H04W 72/10 370/280 |
| 2013/0258986 A1* | 10/2013 | Seo | H04L 1/0026 370/329 |
| 2014/0233419 A1* | 8/2014 | Cheng | H04L 5/0053 370/252 |
| 2014/0301324 A1* | 10/2014 | Cheng | H04L 1/1861 370/329 |
| 2015/0043452 A1* | 2/2015 | Li | H04L 1/0026 370/329 |
| 2016/0149628 A1* | 5/2016 | Davydov | H04B 7/0626 370/329 |
| 2017/0006491 A1* | 1/2017 | Chen | H04B 7/024 |

\* cited by examiner

CHANNEL STATE INFORMATION FOR ENHANCED CARRIER AGGREGATION

CROSS REFERENCES

The present application for patent claims priority to U.S. Provisional Patent Application No. 62/104,659 by Damnjanovic et al., entitled "Channel State Information For Enhanced Carrier Aggregation," filed Jan. 16, 2015, and U.S. Provisional Patent Application No. 62/110,288 by Damnjanovic et al., entitled "Channel State Information For Enhanced Carrier Aggregation," filed Jan. 30, 2015, assigned to the assignee hereof.

BACKGROUND

Field of Disclosure

The following relates generally to wireless communication, and more specifically to channel state information (CSI) for enhanced carrier aggregation (eCA).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

In some cases, one or more base stations may communicate with a user equipment using multiple component carriers. The UE may periodically report CSI for each component carrier. If the number of component carriers is large, the channel state reports may frequently collide, and some of the colliding reports may be dropped. This may degrade the communication link for the UE.

SUMMARY

Systems, methods, and apparatuses for channel state information (CSI) with enhanced carrier aggregation (eCA) are described. An eCA configuration with a large number of component carriers (CCs) may include CCs partitioned or organized into CSI reporting groups. Channel state information for the CCs in each group may be reported together. In some cases, individual CC reports may be combined into a single report, and in other cases a single channel state report may contain information related to each CC in the group. The combined reports may be transmitted over an uplink control channel or an uplink data channel, or both. Collisions between reports may be resolved based on the reporting type of the groups or the serving cell indices of the CCs in the group.

A method of wireless communication is described. The method may include identifying a carrier aggregation configuration comprising a set of component carriers, identifying a CSI reporting configuration for each of a plurality of CSI reporting groups, and each CSI reporting group includes a plurality of component carriers from the set of component carriers in a carrier aggregation configuration, generating a combined report for each of the plurality of CSI reporting groups based at least in part on the corresponding CSI reporting configuration, and transmitting one or more of the combined reports.

An apparatus for wireless communication is described. The apparatus may include means for identifying a carrier aggregation configuration comprising a set of component carriers, means for identifying a CSI reporting configuration for each of a plurality of CSI reporting groups, and each CSI reporting group includes a plurality of component carriers from the set of component carriers in the carrier aggregation configuration, means for generating a combined report for each of the plurality of CSI reporting groups based at least in part on the corresponding CSI reporting configuration, and means for transmitting one or more of the combined reports.

A further apparatus for wireless communication is described. The apparatus may include a processor, memory in electronic communication with the processor, and instructions stored in the memory. The instructions may be executable by the processor to identify a carrier aggregation configuration comprising a set of component carriers, identify a CSI reporting configuration for each of a plurality of CSI reporting groups, and each CSI reporting group includes a plurality of component carriers from the set of component carriers in the carrier aggregation configuration, generate a combined report for each of the plurality of CSI reporting groups based at least in part on the corresponding CSI reporting configuration, and transmit one or more of the combined reports.

A non-transitory computer-readable medium storing code for wireless communication is described. The code may include instructions executable to identify a carrier aggregation configuration comprising a set of component carriers, identify a CSI reporting configuration for each of a plurality of CSI reporting groups, and each CSI reporting group includes a plurality of component carriers from the set of component carriers in a carrier aggregation configuration, generate a combined report for each of the plurality of CSI reporting groups based at least in part on the corresponding CSI reporting configuration, and transmit one or more of the combined reports.

Some examples of the method, apparatuses, or non-transitory computer-readable medium described herein may further include processes, features, means, or instructions for selecting a reference component carrier for each of the CSI reporting groups, identifying a CSI parameter for each of the reference component carriers, calculating a set of CSI values corresponding to each component carrier of the set of component carriers based on the CSI parameter for the reference component carrier, and each of the combined reports includes the CSI parameter for the corresponding reference component carrier and a subset of CSI values for the corresponding plurality of component carriers. Additionally or alternatively, in some examples, each of the combined reports includes CSI information for each of the plurality of component carriers in a corresponding CSI reporting group.

In some examples of the method, apparatuses, or non-transitory computer-readable medium described herein, each component carrier from the set of component carrier is associated with a CSI reporting group of the plurality of CSI reporting groups. Additionally or alternatively, in some examples generating the combined report for each of the plurality of CSI reporting groups includes multiplexing a plurality of CSI reports corresponding to the plurality of component carriers in the CSI reporting group. In some examples, each of the individual CSI reports is based at least part on an individual physical uplink control channel (PUCCH) format.

In some examples of the method, apparatuses, or non-transitory computer-readable medium described herein, the one or more of the combined reports include HARQ feedback, transmitting the one or more of the combined reports includes transmitting HARQ with a first combined report on a first UL control channel, and transmitting remaining combined reports on a second UL control channel on a different CC than the first UL control channel. Additionally or alternatively, in some examples the individual PUCCH format is a PUCCH format 3.

In some examples of the method, apparatuses, or non-transitory computer-readable medium described herein, transmitting the one or more combined reports includes transmitting the one or more of the combined reports on a physical uplink shared channel (PUSCH) according to a semi-persistent scheduling configuration. Additionally or alternatively, in some examples at least one of the combined reports includes at least one of HARQ feedback or a scheduling request (SR) or both.

Some examples of the method, apparatuses, or non-transitory computer-readable medium described herein may further include processes, features, means, or instructions for sending an indication that the one or more CSI reports includes HARQ feedback. Additionally or alternatively, in some examples the one or more combined reports are jointly coded.

Some examples of the method, apparatuses, or non-transitory computer-readable medium described herein may further include processes, features, means, or instructions for selecting the semi-persistent scheduling configuration for the PUSCH based at least in part on a periodicity of the one or more combined reports. Additionally or alternatively, some examples may include processes, features, means, or instructions for transmitting data using remaining resources of the PUSCH according to the semi-persistent scheduling configuration.

Additionally or alternatively, in some examples each of the CSI reporting configurations includes a CSI reporting periodicity, and transmitting the one or more combined reports includes transmitting the one or more combined reports based at least in part on the CSI reporting periodicity.

Some examples of the method, apparatuses, or non-transitory computer-readable medium described herein may further include processes, features, means, or instructions for identifying a collision between two or more of the combined reports, and refraining from transmitting at least one of the two or more combined reports based at least in part on a prioritization scheme and the identified collision. Additionally or alternatively, in some examples the prioritization scheme is based at least in part on a set of reporting types, and each component carrier of the plurality of component carriers in each CSI reporting group has a same reporting type.

In some examples of the method, apparatuses, or non-transitory computer-readable medium described herein, the prioritization scheme is further based at least in part on a lowest serving cell index.

A method of wireless communication is described. The method may include configuring a set of component carriers in a carrier aggregation configuration for a UE, partitioning the set of component carriers into a plurality of CSI reporting groups, and each CSI reporting group includes a plurality of component carriers, configuring each CSI reporting group with a CSI reporting configuration, and receiving from the UE one or more combined reports corresponding to CSI reporting groups based at least in part on the corresponding CSI reporting configurations.

An apparatus for wireless communication is described. The apparatus may include means for configuring a set of component carriers in a carrier aggregation configuration for a UE, means for partitioning the set of component carriers into a plurality of CSI reporting groups, and each CSI reporting group includes a plurality of component carriers, means for configuring each CSI reporting group with a CSI reporting configuration, and means for receiving from the UE one or more combined reports corresponding to CSI reporting groups based at least in part on the corresponding CSI reporting configurations.

A further apparatus for wireless communication is described. The apparatus may include a processor, memory in electronic communication with the processor, and instructions stored in the memory. The instructions may be executable by the processor to configure a set of component carriers in a carrier aggregation configuration for a UE, partition the set of component carriers into a plurality of CSI reporting groups, and each CSI reporting group includes a plurality of component carriers, configure each CSI reporting group with a CSI reporting configuration, and receive from the UE one or more combined reports corresponding to CSI reporting groups based at least in part on the corresponding CSI reporting configurations.

A non-transitory computer-readable medium storing code for wireless communication is described. The code may include instructions executable to configure a set of component carriers in a carrier aggregation configuration for a UE, partition the set of component carriers into a plurality of CSI reporting groups, and each CSI reporting group includes a plurality of component carriers, configure each CSI reporting group with a CSI reporting configuration, and receive from the UE one or more combined reports corresponding to CSI reporting groups based at least in part on the corresponding CSI reporting configurations.

In some examples of the method, apparatuses, or non-transitory computer-readable medium described herein, partitioning the set of component carriers includes selecting a plurality of component carriers for each CSI reporting group based at least in part on a set of reporting types. Additionally or alternatively, in some examples partitioning the set of component carriers includes selecting a plurality of component carriers for each CSI reporting group based at least in part on a CSI reporting periodicity.

In some examples of the method, apparatuses, or non-transitory computer-readable medium described herein, each of the combined reports includes CSI information for each of the plurality of component carriers in a corresponding CSI reporting group. Additionally or alternatively, in some examples each component carrier from the set of component carrier is in a CSI reporting group of the plurality of CSI reporting groups.

In some examples of the method, apparatuses, or non-transitory computer-readable medium described herein, receiving the one or more combined reports includes receiving multiplexed CSI corresponding to the plurality of component carriers in the CSI reporting group. The CSI may be based at least part on an individual PUCCH format. Additionally or alternatively, in some examples the one or more of the combined reports includes HARQ feedback, receiving the one or more of the combined reports includes receiving the one or more of the combined reports on a first UL control channel, and receiving one or more additional combined reports on a second UL control channel on a different CC than the first UL control channel.

In some examples of the method, apparatuses, or non-transitory computer-readable medium described herein, the individual PUCCH format is a PUCCH format 3. Additionally or alternatively, in some examples receiving the one or more combined reports includes receiving the one or more of the combined reports on a PUSCH according to a semi-persistent scheduling configuration.

In some examples of the method, apparatuses, or non-transitory computer-readable medium described herein, at least one of the combined reports includes at least one of HARQ feedback or an SR or both. Additionally or alternatively, some examples may include processes, features, means, or instructions for receiving an indication that the one or more CSI reports includes HARQ feedback.

In some examples of the method, apparatuses, or non-transitory computer-readable medium described herein, the one or more combined reports are jointly coded. Additionally or alternatively, some examples may include processes, features, means, or instructions for determining the semi-persistent scheduling configuration for the PUSCH based at least in part on a periodicity of the one or more combined reports.

Some examples of the method, apparatuses, or non-transitory computer-readable medium described above may further include processes, features, means, or instructions for receiving data on remaining resources of the PUSCH according to a semi-persistent scheduling configuration.

In some examples of the method, apparatuses, or non-transitory computer-readable medium described herein, each of the CSI reporting configurations includes a CSI reporting periodicity, and receiving the one or more combined reports includes receiving the one or more combined reports based at least in part on the CSI reporting periodicity.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
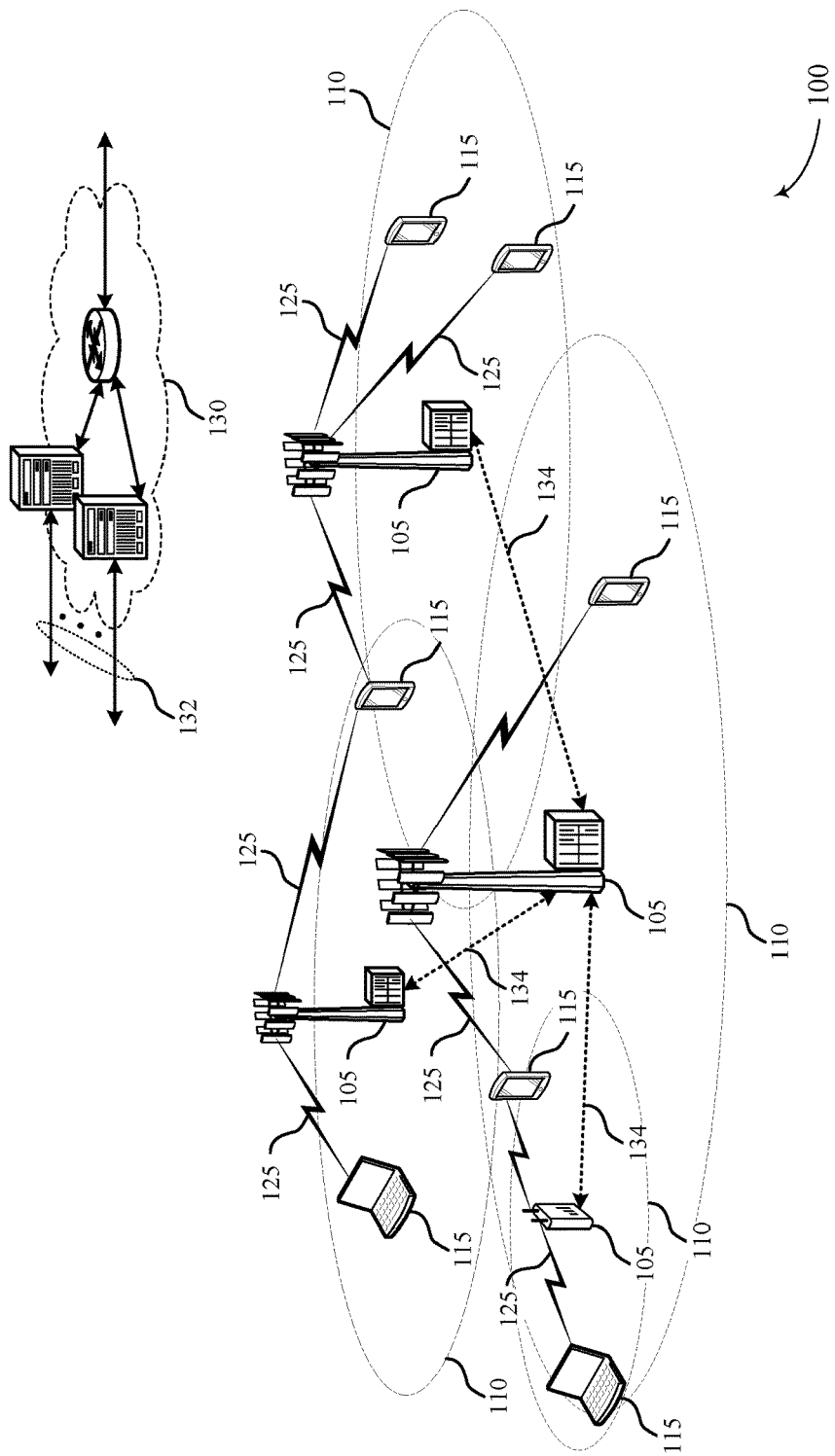
FIG. 1 illustrates an exemplary wireless communications system that supports channel state information (CSI) for enhanced carrier aggregation (eCA) in accordance with various aspects of the present disclosure.

Within an enhanced carrier aggregation (eCA) configuration, which may include a large number of component carriers (CCs), the CCs may be partitioned or organized into channel state information (CSI) reporting groups. Channel state reports for the CCs in each group may be reported together. In some cases, individual CC reports may be multiplexed into a single report and in other cases a single channel state report may contain information related to each CC in the group. The combined reports may be transmitted over an uplink control channel or an uplink data channel, or both. Collisions between reports may be resolved based on the reporting type of the groups or the serving cell indices of the CCs in the group.

Some wireless systems may support CA with up to 5 CCs. However, other wireless systems may support CA with up to 32 CCs, or more. In either case, the CA configuration may be based on a single UL control channel or on multiple UL control channels associated with different SCells. Increasing the maximum number of CCs may enable network operators to more efficiently utilize the available spectrum, which may include unlicensed portions of wireless spectrum.

In wireless systems with a relatively low number of CCs (e.g., a maximum of 5 CCs), CSI may be reported for each CC independently. For example, CSI for each CC may be transmitted on PUCCH on a PCell or as a part of UCI on PUSCH. In some cases, periodic CSI reports may be limited to a single report during a given subframe. If two reports collide (e.g., if they are scheduled for the same subframe), a prioritization scheme may determine which report is transmitted. In some cases, the prioritization scheme may be based on the reporting type of the report (e.g., based on whether the report includes CQI, PMI, or RI information). For reports of the same type, prioritization may be based on the serving cell index of the CC being reported. If the number of CCs increases, the likelihood a collision may increase.

Thus, according to the present disclosure, within a wireless system with a large number of CCs, combined reports for groups of CCs may be utilized instead of reporting CSI for each CC individuals. In some cases, CCs may be grouped for both periodic and aperiodic CSI reports. In other cases, only periodic reports may be combined. To reduce the size of the combined reports, a reference CC may be selected and the CQI information for other CCs in the group may be represented by delta values relative to the reference CC. In some cases, the reference CC may be semi-statically configured. In other cases, the reference CC may cycle among the CCs in the group. In various examples, different components of the system—e.g., base stations, entities within the core network, or the like—may configure groups of CCs for CSI reporting.

A prioritization scheme for CQI reporting groups may be used to resolve collisions, or when the reporting capacity is exceeded. Prioritization among CSI reporting groups can be based on the reporting type of the group. Within a group, the reporting type may be the same across all CCs. In some cases, the reporting type of individual CCs may be used to select groups with the same reporting type. If a collision between two groups with the same reporting type occurs, a secondary prioritization based on serving cell index may be used to resolve the conflict. For example, the group with the smallest serving cell index among the constituent CCs may be reported and the other combined report may be dropped.

In some cases, a similar format may be used for a combined report as is used for individual reports. For example, PUCCH format 3 may carry up to 22 bits and may include one CSI report multiplexed with acknowledgement/negative acknowledgement (ACK/NACK) and SR fields. Systems with a large number of CCs may allow more than one CC CSI report multiplexed in Format 3 to be combined when possible (e.g., if there is no ACK/NACK feedback). However, this may not be sufficient for systems that include very large number of CCs. Thus, a system may also enable the configuration of a combined report including more than one report (e.g., more than one Format 3 report) to be transmitted simultaneously. In some cases, one report may carry both ACK/NACK and CSI information while other reports in the combined report may carry CSI without ACK/NACK. In some cases, multiple CSI reports may be transmitted in the same subframe.

In different examples, combined reports may be configured semi-persistently on either PUCCH or PUSCH. In some cases, CCs for which CSI is transmitted can be explicitly signaled. If the CSI reports are transmitted on PUSCH, the periodicity of the PUSCH may be configured to match the desired CSI reporting rate. HARQ feedback (ACK/NACK) and SR information may also be multiplexed on the PUSCH. In some cases, HARQ feedback on PUSCH may depend on the support of parallel PUCCH/PUSCH channel transmission. In some cases, joint coding may be used for HARQ feedback/CSI/SR on PUSCH. A flag may notify a receiving entity of the existence of different information types (e.g., HARQ feedback) in the payload. If any PUSCH resources are unused after HARQ feedback/CST/SR, regular (non-UCI) data can be transmitted using the excess resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an exemplary wireless communications system 100 in accordance with various aspects of the present disclosure. The wireless communications system 100 includes base stations 105, UEs 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARM) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a CC, a layer, a channel, etc. The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. In some version of CA, the number of component carriers may be limited to 5. However, in other CA configurations a higher number of CCs may be used (e.g., up to 32 or more). A large number of CCs may be part of a next-generation CA configuration known as enhanced carrier aggregation (eCA).

Systems implementing eCA may utilize one or more enhanced component carriers (eCCs). An eCC may be characterized by one or more features including: flexible bandwidth, variable length transmission time interval (TTIs), and modified control channel configuration. In some cases, an eCC may be associated with a carrier aggregation configuration or a dual connectivity configuration (e.g., when multiple serving cells have a suboptimal backhaul link). An eCC may also be configured for use in unlicensed spectrum or shared spectrum (where more than one operator is licensed to use the spectrum). An eCC characterized by flexible bandwidth may include one or more segments that may be utilized by UEs 115 that do are not capable of monitoring the whole bandwidth or prefer to use a limited bandwidth (e.g., to conserve power).

In some cases, an eCC may utilize a variable TTI length and symbol duration. In some cases an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing.

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information.

A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an UL component carrier (CC) and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and uplink shared channel (UL-SCH) for data. DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data.

HARQ may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information.

The PUCCH may be mapped to a control channel defined by a code and two consecutive resource blocks. UL control signaling may depend on the presence of timing synchronization for a cell. PUCCH resources for scheduling request (SR) and channel quality indicator (CQI) reporting may be assigned (and revoked) through RRC signaling. In some cases, resources for SR may be assigned after acquiring synchronization through a RACH procedure. In other cases, an SR may not be assigned to a UE 115 through the RACH (i.e., synchronized UEs may or may not have a dedicated SR channel). PUCCH resources for SR and CQI may be lost when the UE is no longer synchronized.

A base station 105 may insert periodic pilot symbols such as cell-specific reference signals (CRS) to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the coverage area 110 of the base station 105, demodulation reference signal (DMRS) may be directed toward specific UEs 115 and may be transmitted only on resource blocks assigned to those UEs 115. DMRS may include signals on 6 resource elements in each resource block in which they are transmitted. In some cases, two sets of DMRS may be transmitted in adjoining resource elements. In some cases, additional reference signals known as CSI reference signals (CSI-RS) may be included to aid in generating channel state information (CSI). On the UL, a UE 115 may transmit a combination of periodic sounding reference signal (SRS) and UL DMRS for link adaptation and demodulation, respectively.

A base station 105 may gather channel condition information from a UE 115 in order to efficiently configure schedule the channel. This information may be sent from the UE 115 in the form of a channel state report. A channel state report may contain a rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a CQI representing the highest modulation and coding scheme (MCS) that may be used. CQI may be calculated by a UE 115 after receiving predetermined pilot symbols such as CRS or CSI-RS. RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

For an eCA configuration with a large number of component carriers CCs (e.g., more than 5), conventional CSI reporting techniques may be inadequate, and such techniques may become increasingly inadequate as the number carriers increase (e.g., as the number approaches 32 CCs). A system employing an eCA configuration may thus group the CCs into CSI reporting groups. Channel state reports for the CCs in each group may be reported together. In some cases, individual CC reports may be multiplexed into a single report and in other cases a single channel state report may contain information related to each CC in the group. The combined reports may be transmitted over an uplink control channel or an uplink data channel. Collisions between reports may be resolved based on the reporting type of the groups or the serving cell indices of the CCs in the group.

Figure 2:
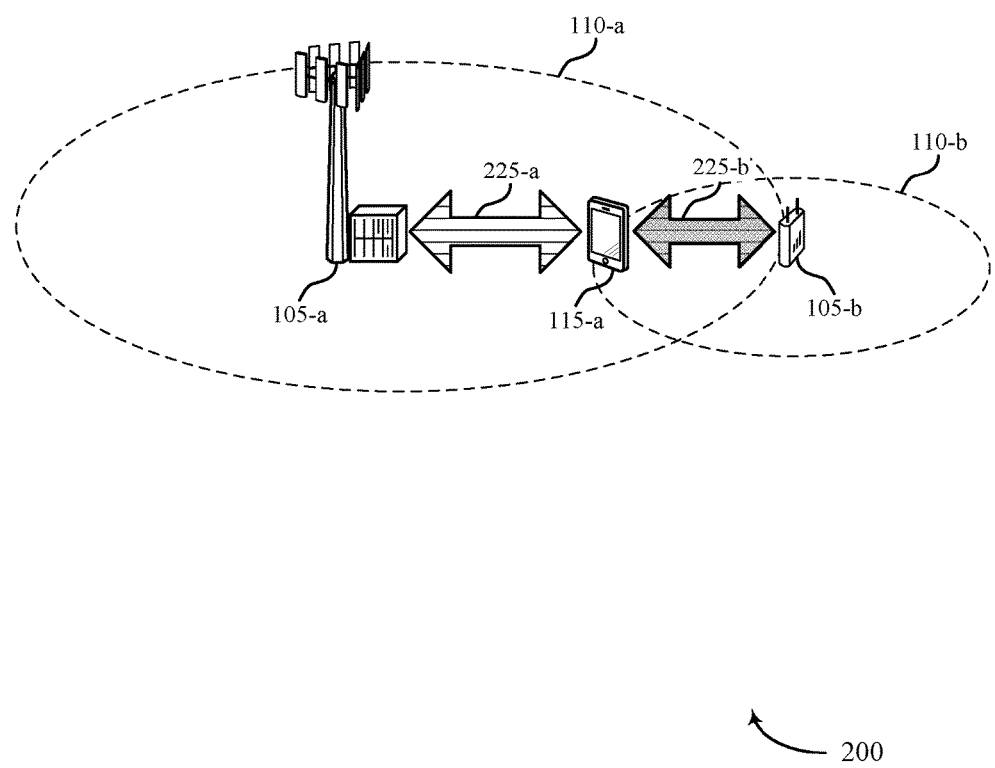
FIG. 2 illustrates an exemplary wireless communications subsystem that supports CSI reporting for eCA in accordance with various aspects of the present disclosure.

FIG. 2 illustrates an exemplary wireless communications subsystem 200 for CSI reporting with eCA in accordance with various aspects of the present disclosure. Wireless communications subsystem 200 may include a UE 115-*a*, which may be an example of a UE 115 described above with reference to FIG. 1. Wireless communications subsystem 200 may also include base station 105-*a* and 105-*b*, which may be an example of a base station 105 described above with reference to FIG. 1. In some examples, base station 105-*b* may represent a small cell (e.g., a small cell located within the coverage area of base station 105-*a*).

UE 115-*a* may communicate with base stations 105-*a* and 105-*b* using communication links 225-*a* and 225-*b*, respectively. Communication links 225-*a* and 225-*b* may each include multiple CCs organized according to a CA configuration. The CCs of communication links 225-*a* and 225-*b* may each include contiguous or non-contiguous frequency bands, and in some cases the frequency bands of the different links may overlap. In some cases, one of the CCs may be designated as a PCell, and the other CCs may correspond to SCells.

The CC's of communication links 225-*a* may be organized according to CSI reporting groups that may send combined reports. In some cases, a CSI reporting group may include CCs from both communication links, and in other cases, the CSI reporting groups may include CCs from only one communication link (e.g., associated with a single base station). The groups may be selected and configured such that each group is associated with a CSI reporting type (e.g., indicating whether the group will report CQI, PMI, and RI) and a reporting periodicity. In some cases, CCs may be combined for the purpose of combining both periodic and aperiodic CSI reports. In other cases, periodic reports may be combined and aperiodic reports may remain separate.

In some examples, base station 105-*a* may configure UE 115-*a* with a number CCs in a carrier aggregation configuration (e.g., via communication link 225-*a*). The network associated with base station 105-*a* (e.g., network 130 of FIG. 1), or base station 105-*a* may configure the CCs in CSI reporting groups. Base station 105-*a* may signal the carrier aggregation configuration and the CSI reporting group configuration to UE 115-*a*. This may be done using RRC signaling, for example. UE 115-*a* may then transmit CSI to base station 105-*a* based on the signal. For instance, UE 115-*a* may transmit combined reports according to the received CSI reporting group configuration.

Grouping the CCs into CSI reporting groups and sending combined reports may reduce the number of collisions between CSI reports. However, if a collision does occur, in some cases one or more of the colliding reports may be dropped based on a prioritization scheme. For example, CSI reporting groups may be prioritized based on reporting type, and if a collision between two combined reports with the same reporting type occurs, the combined report representing the CSI reporting group including the CC with the lowest serving cell index may be transmitted and the other reports may be dropped. For example, a PCell may have a serving cell index of 0, and so reporting the CSI for the PCell may take precedence over other CSI reports.

Different options may exist for aggregating and transmitting the CSI information of multiple CCs in a CSI reporting group. For example, in some cases the payload of the report may consist of multiple reports having a format associated with an individual report (e.g., PUCCH format 3, which may include fields adding up to 22 bits) that are multiplexed together. In this case, one of the multiplexed reports may also include ACK/NACK information. In another example, a single report may include a CSI parameter for a reference CC (which may cycle between the CCs of the group) and delta values that relate the CSI parameters of the other CCs to that of the reference CC. Regardless of how the combined report is generated, an additional flag may indicate the presence or absence of HARQ feedback. Combined reporting groups may be transmitted over either PUCCH, PUSCH or both. If PUSCH is used, the PUSCH resources may be allocated semi-persistently based on the reporting periodicity of the CSI reporting groups.

Figure 3:
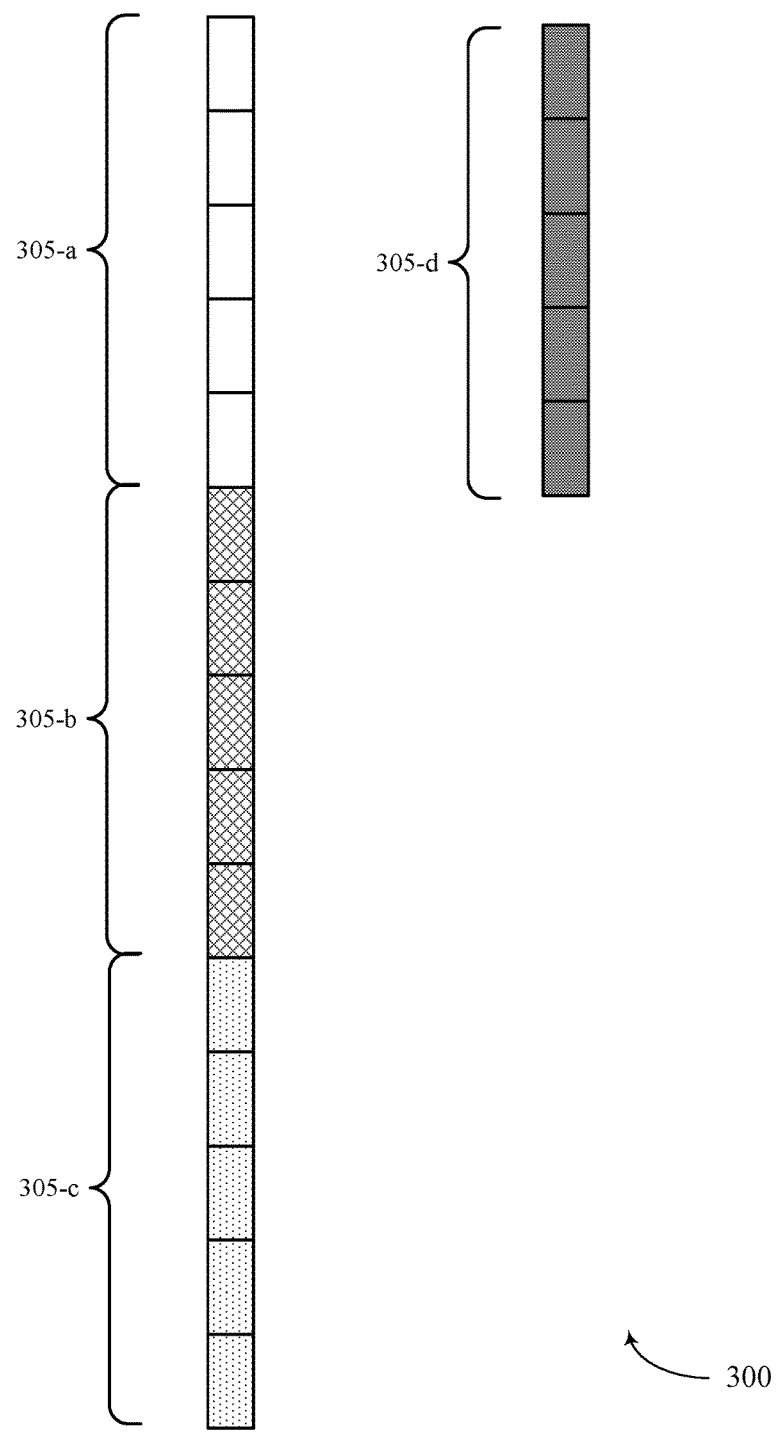
FIG. 3 illustrates an exemplary CSI reporting group configuration that supports CSI reporting for eCA in accordance with various aspects of the present disclosure.

FIG. 3 illustrates an exemplary CSI reporting group configuration 300 for CSI reporting with eCA in accordance with various aspects of the present disclosure. CSI reporting group configuration 300 may represent a CA configuration between a UE 115 and a base station 105, as described above with reference to FIGS. 1-2. The CCs of CSI reporting group configuration 300 may be divided into CSI reporting groups 305. In some cases, the CCs in each group represent contiguous frequency bands. In other cases, the CCs in each group may be selected based on a desired reporting type or periodicity. In other examples, CCs associated with different base stations 105 may be grouped. For instance, as illustrated in CSI reporting group configuration 300, CSI reporting groups 305-a, 305-b, and 305-c may correspond to a single macro base station whereas CSI reporting group 305-d may correspond to a small cell base station 105. In some examples, the CSI reporting groups may each have the same number of CCs but in other examples the groups may each have a different number CCs.

Figure 4:
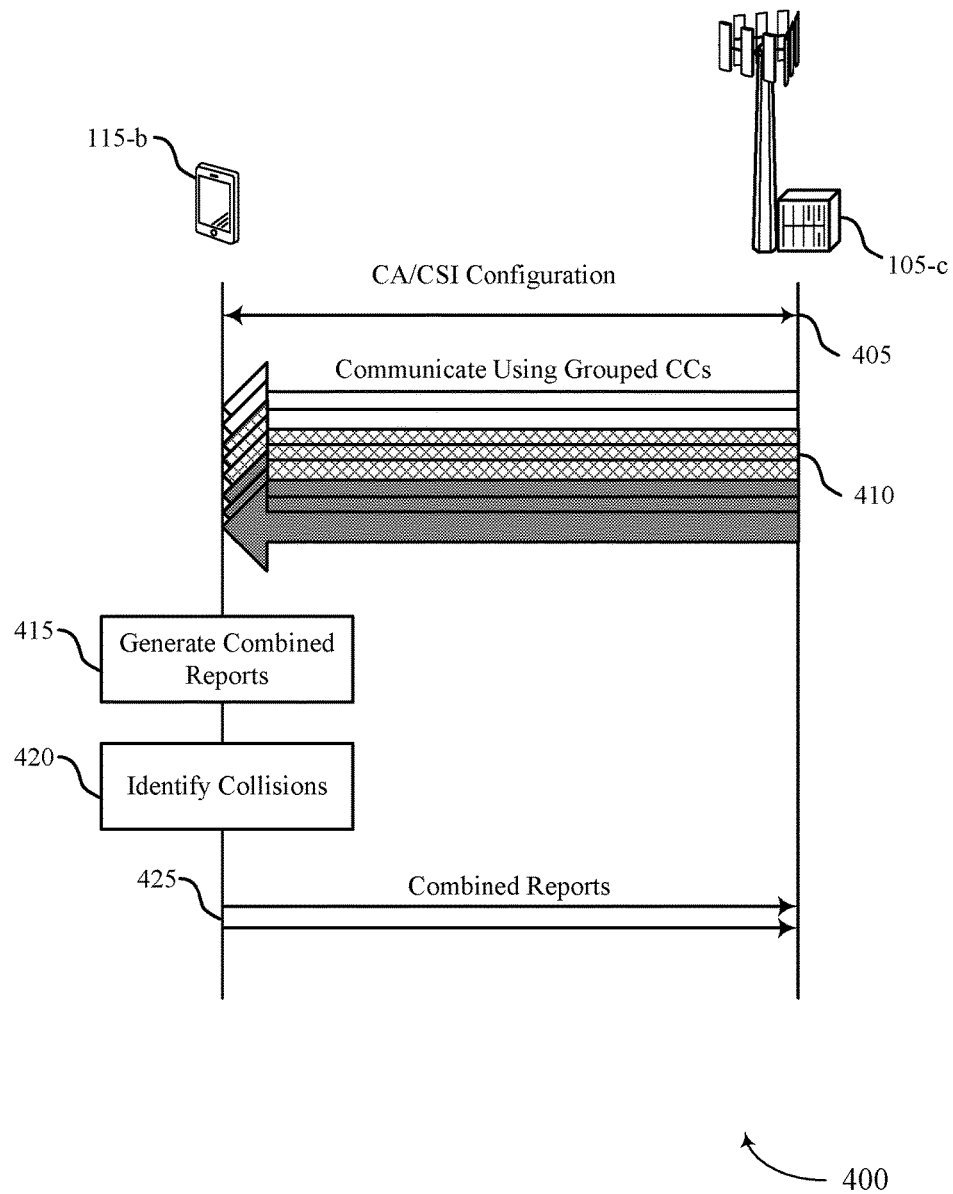
FIG. 4 illustrates an exemplary process flow that supports CSI reporting for eCA in accordance with various aspects of the present disclosure.

FIG. 4 illustrates an exemplary process flow 400 for CSI reporting with eCA in accordance with various aspects of the present disclosure. Process flow 400 may include a UE 115-b, which may be an example of UE 115 as described above with reference to FIGS. 1-2. Process flow 400 may also include a base station 105-c, which may be an example of a base station 105 as described above with reference to FIGS. 1-2.

At step 405, base station 105-c and UE 115-b may establish a CA configuration including a large number of CCs. The CCs may be grouped into a number of CSI reporting groups. For example, base station 105-c may partition the set of component carriers into a plurality of CSI reporting groups, and each CSI reporting group may include several component carriers. In some examples, partitioning the set of component carriers includes selecting a number component carriers for each CSI reporting group based on reporting types (e.g., establishing which type from a set of reporting types is assigned to each CSI reporting group). In some examples, partitioning the set of component carriers is based on a CSI reporting periodicity.

Thus, UE 115-b may identify a carrier aggregation configuration for the set of component carriers, identify the CSI reporting groups, and then identify a CSI reporting configuration for each of the CSI reporting groups. In some examples, each CC from the set of CC is configured with a reporting type and a CSI reporting periodicity.

At step 410, base station 105-c and UE 115-b may exchange data using the configured CCs. For example, base station 105-c may transmit data interspersed with pilot symbols (e.g., CRS and CSI-RS) that may be used by UE 115-b to determine both instantaneous and statistical CSI.

At step 415, UE 115-b may generate a combined report for each CSI reporting group based on the corresponding CSI reporting configuration. In some cases, UE 115-b may select a reference CC for each of the CSI reporting groups, identify a CSI parameter for each of the reference CCs and calculate a set of CSI delta values corresponding to each CC except for the reference CCs. Each of the combined reports may include the CSI parameter for the corresponding reference CC and the CSI delta values for the corresponding CCs.

In some examples, generating a combined report includes multiplexing a set of individual CSI reports corresponding to the plurality of CCs in the CSI reporting group. Each of the individual CSI reports may be based on an individual PUCCH format. In some examples, the combined reports include HARQ feedback, a scheduling request, or both.

At step 420, UE 115-b may identify potential collisions between combined reports that may be scheduled at the same time. The collisions may be resolved using a prioritization scheme based on the reporting type of the reports and, if collisions still occur, the serving cell index of the CCs in each CSI reporting group. For example, if two CSI reporting groups have the same reporting type, the group having a CC with the lowest serving cell index may be transmitted and other colliding group reports may be dropped.

At step 425, UE 115-b may transmit a number combined reports and refrain from transmitting certain reports to avoid collisions based on the report prioritization. The reports may be transmitted over PUCCH, PUSCH, or both, as described above. UE 115-b may also refrain from transmitting at least one of the combined reports based on the prioritization scheme and the identified collision (e.g., colliding reports may be dropped). the timing of the transmissions may be based on the CSI reporting periodicity of each group.

In some examples, the combined reports may be transmitted on an UL control channel. In some cases, other combined reports may be transmit on another control channel. For example, UE 115-b may transmit a second CSI report on a second UL control channel on a different CC than the first UL control channel. In some cases, the combined reports include a number of multiplexed individual reports based on a PUCCH format (e.g., PUCCH format 3).

The UE 115-b may, for example, transmit the combined reports on a PUSCH using a semi-persistent scheduling configuration. Base station 105-c may select the semi-persistent scheduling configuration for the PUSCH based on the periodicity of the reports. UE 115-b may transmit data using remaining resources of the PUSCH according to the semi-persistent scheduling configuration after transmission of a combined report. In some examples, the one or more combined reports are jointly coded. UE 115-b may transmit a signal on a PUCCH simultaneously to the one or more combined reports on the PUSCH. UE 115-b may also send an explicit indication of whether the CSI reports includes HARQ feedback.

Figure 5:
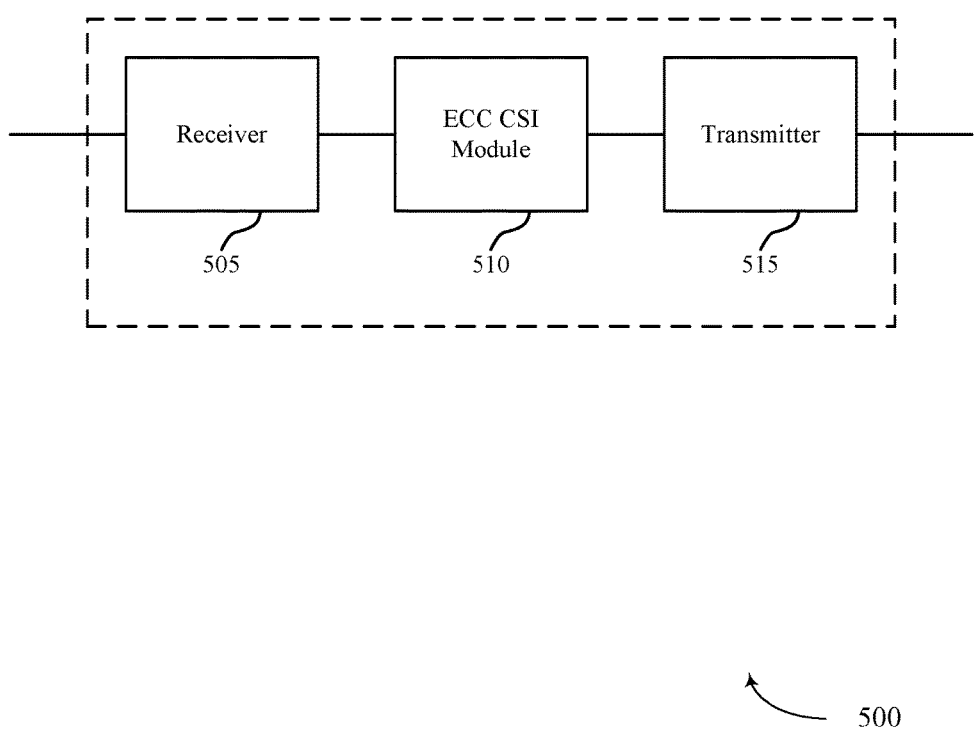
FIG. 5 shows a block diagram of a wireless device that supports CSI reporting for eCA in accordance with various aspects of the present disclosure.

FIG. 5 shows a block diagram of a wireless device 500 configured for CSI reporting for eCA in accordance with various aspects of the present disclosure. Wireless device 500 may be an exemplary aspects of a UE 115 described with reference to FIGS. 1-4. Wireless device 500 may include a receiver 505, an enhanced CC (eCC) CSI module 510, or a transmitter 515. Wireless device 500 may also include a processor. Each of these components may be in communication with one another.

The receiver 505 may receive information such as packets, user data, or control information associated with various information channels (e.g., control channels, data channels, and information related to CSI reporting for eCA, etc.). Information may be passed on to the eCC CSI module 510, and to other components of wireless device 500.

The eCC CSI module 510 may identify a carrier aggregation configuration for a set of CCs, identify a CSI reporting configuration for each of a plurality of CSI reporting groups, and each CSI reporting group includes a plurality of CCs from the set of CCs, generate a combined report for each of the plurality of CSI reporting groups based on the corresponding CSI reporting configuration, and transmit one or more of the combined reports.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas. In some examples, the transmitter 515 may transmit one or more of the combined reports. In some examples, transmitter 515 may transmit one or more combined reports on a first UL control channel and transmit a second CSI report on a second UL control channel on a different CC than the first UL control channel. Additionally or alternatively, the transmitter 515 may transmit a signal on a PUCCH simultaneously to transmitting the one or more combined reports on the PUSCH. In some examples, transmitting the one or more combined reports is based on a CSI reporting periodicity.

Figure 6:
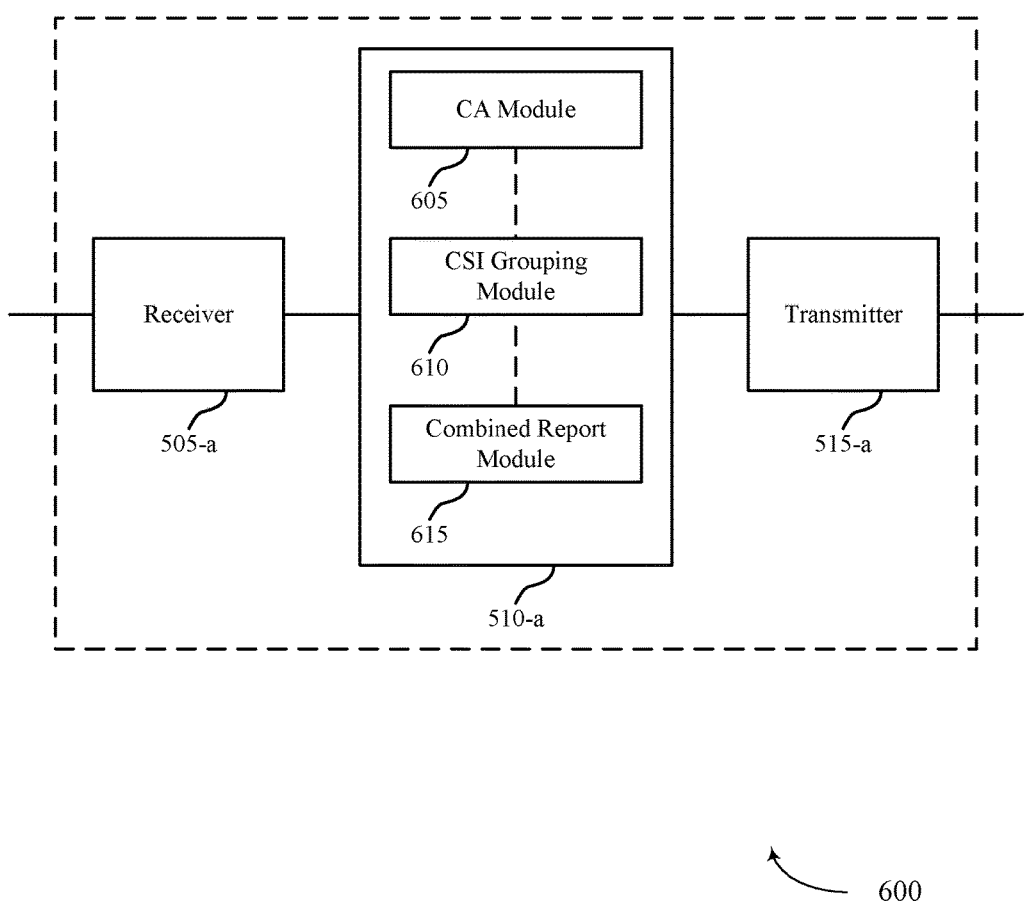
FIG. 6 shows a block diagram of a wireless device that supports CSI reporting for eCA in accordance with various aspects of the present disclosure.

FIG. 6 shows a block diagram of a wireless device 600 for CSI reporting for eCA in accordance with various aspects of the present disclosure. Wireless device 600 may be an exemplary aspects of a wireless device 500 or a UE 115 described with reference to FIGS. 1-5. Wireless device 600 may include a receiver 505-a, an eCC CSI module 510-a, or a transmitter 515-a. Wireless device 600 may also include a processor. Each of these components may be in communication with one another. The eCC CSI module 510-a may also include a CA module 605, a CSI grouping module 610, and a combined report module 615.

The receiver 505-a may receive information which may be passed on to eCC CSI module 510-a, and to other components of the device. The eCC CSI module 510-a may perform the operations described above with reference to FIG. 5. The transmitter 515-a may transmit signals received from other components of wireless device 600.

The CA module 605 may identify a carrier aggregation configuration for a set of CCs as described above with reference to FIGS. 2-4. The CA configuration may include a large number of CCs (e.g., up to 32, or more in some cases).

The CSI grouping module 610 may identify a CSI reporting configuration for each of a plurality of CSI reporting groups, and each CSI reporting group may include several CCs from the set of CCs as described above with reference to FIGS. 2-4. In some examples, each CC from the set of CC may be in a CSI reporting group of the several CSI reporting groups.

The combined report module 615 may generate a combined report for each of the several CSI reporting groups based, for example, on the corresponding CSI reporting configuration as described above with reference to FIGS. 2-4. In some examples, each of the combined reports includes CSI information for each of the several CCs in a corresponding CSI reporting group. In some examples, generating the combined report for each of the CSI reporting groups includes multiplexing a set of individual CSI reports corresponding to the plurality of CCs in the CSI reporting group, and each of the individual CSI reports may be based at least part on an individual PUCCH format. In some examples, the individual PUCCH format may be a PUCCH format 3.

The components of wireless devices 500 and 600 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 7:
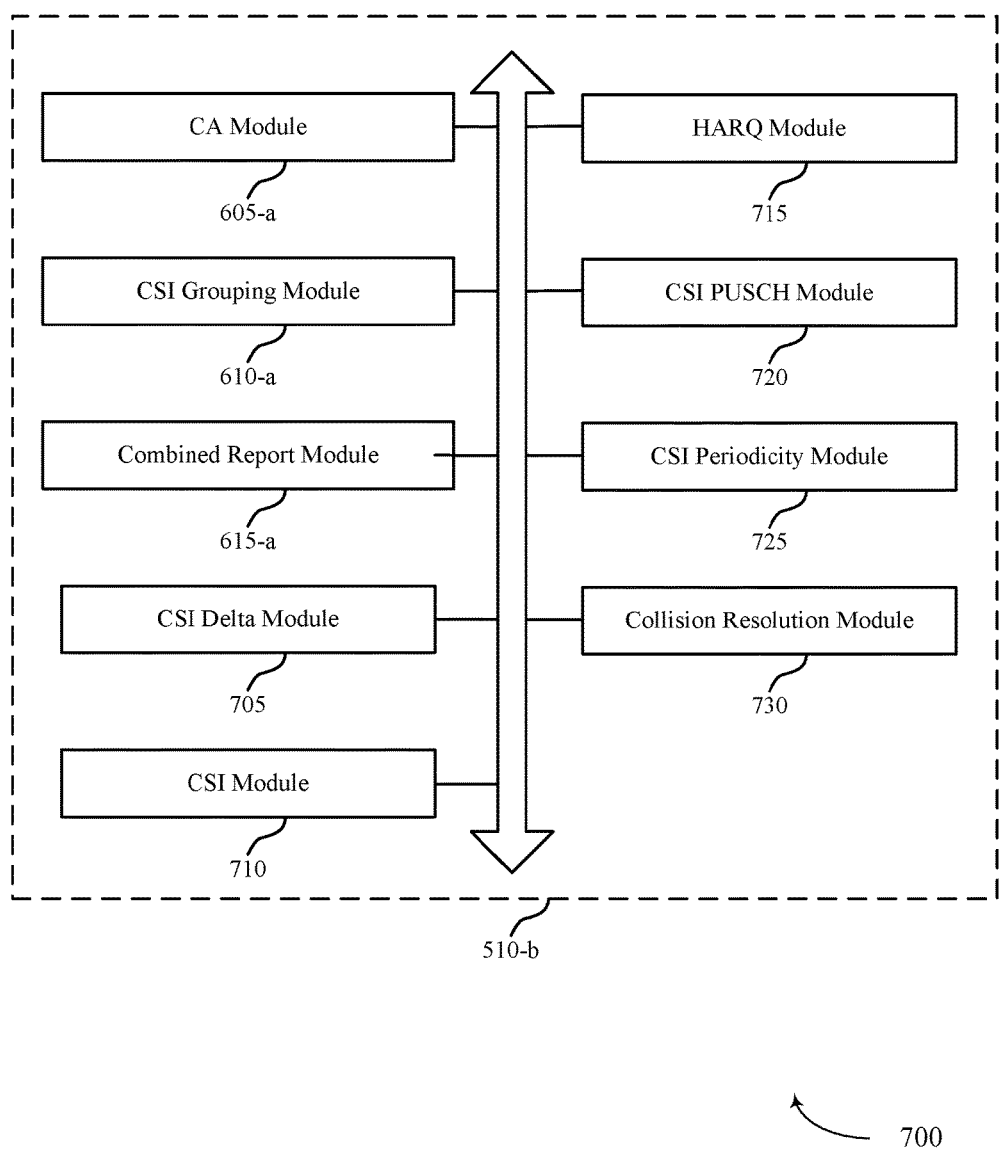
FIG. 7 shows a block diagram of a wireless device that supports CSI reporting for eCA in accordance with various aspects of the present disclosure.

FIG. 7 shows a block diagram 700 of an eCC CSI module 510-b which may be a component of a wireless device 500 or a wireless device 600 for CSI reporting for eCA in accordance with various aspects of the present disclosure. The eCC CSI module 510-b may be an example of aspects of an eCC CSI module 510 described with reference to FIGS. 5 and 6. The eCC CSI module 510-b may include a CA module 605-a, a CSI grouping module 610-a, and a combined report module 615-a. Each of these modules may perform the functions described above with reference to FIG. 6. The eCC CSI module 510-b may also include a CSI delta module 705, a CSI module 710, a HARQ module 715, a CSI PUSCH module 720, a CSI periodicity module 725, and a collision resolution module 730.

The components of the eCC CSI module 510-b may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The CSI delta module 705 may select a reference CC for each of the CSI reporting groups as described above with reference to FIGS. 2-4. The CSI delta module 705 may also calculate a set of CSI delta values corresponding to each CC of the set of CCs except for the reference CCs. In some examples, each of the combined reports includes the CSI parameter for the corresponding reference CC and a subset of CSI delta values for the corresponding plurality of CCs.

The CSI module 710 may identify a CSI parameter for each of the reference CCs as described above with reference to FIGS. 2-4. This may enable calculation of the delta values described above.

The HARQ module 715 may be to include HARQ feedback with a combined report as described above with reference to FIGS. 2-4. The HARQ module 715 may also send an indication that the one or more CSI reports includes HARQ feedback. In some examples, at least one of the combined reports includes at least one of HARQ feedback or an SR, or both.

The CSI PUSCH module 720 may be configured to coordinate with a transmitter to send one or more combined reports on a PUSCH using a semi-persistent scheduling configuration as described above with reference to FIGS. 2-4. In some examples, the one or more combined reports transmitted on PUSCH are jointly coded. The CSI PUSCH module 720 may also select or identify the semi-persistent scheduling configuration for the PUSCH based on a periodicity of the one or more combined reports. The CSI PUSCH module 720 may also coordinate with a transmitter to transmit data using remaining resources of the PUSCH.

The CSI periodicity module 725 may be configured to identify reporting configurations according to a CSI reporting periodicity as described above with reference to FIGS. 2-4.

The collision resolution module 730 may identify a collision between two or more of the combined reports as described above with reference to FIGS. 2-4. The collision resolution module 730 may also refrain from, or cause a wireless device to refrain from, transmitting a combined report based on a prioritization scheme and the identified collision. In some examples, the prioritization scheme may be based on a set of reporting types, and each CC of the plurality of CCs in each CSI reporting group has a same reporting type. In some examples, the prioritization scheme may be further based on a lowest serving cell index.

Figure 8:
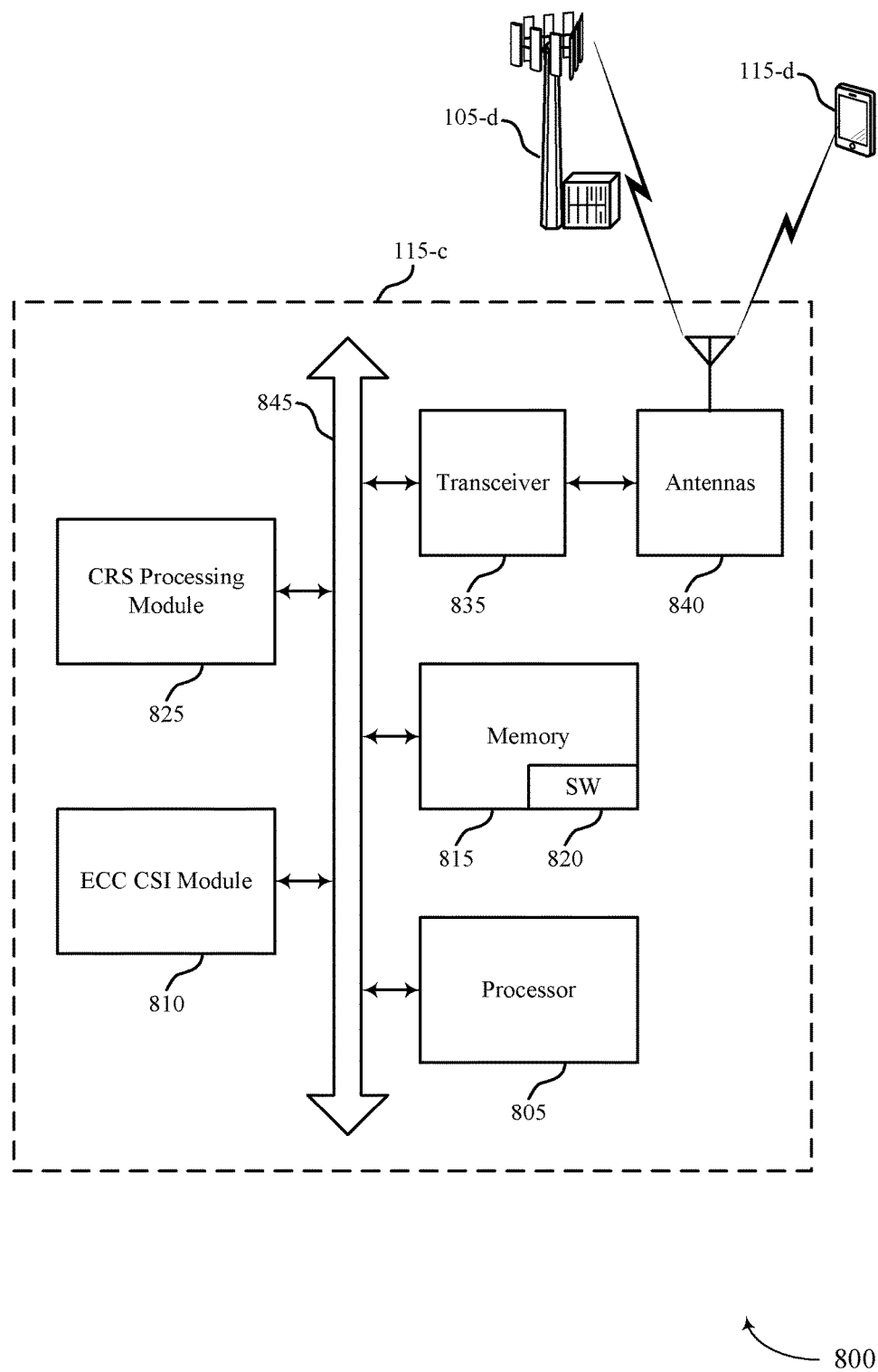
FIG. 8 illustrates a block diagram of a system including a user equipment (UE) that supports CSI reporting for eCA in accordance with various aspects of the present disclosure.

FIG. 8 shows a diagram of a system 800 including a UE 115 configured for CSI reporting for eCA in accordance with various aspects of the present disclosure. System 800 may include UE 115-c, which may be an example of a wireless device 500, a wireless device 600, or a UE 115 described above with reference to FIGS. 1, 2 and 5-7. UE 115-c may include an eCC CSI module 810, which may be an example of an eCC CSI module 510 described with reference to FIGS. 5-7. UE 115-c may also include a CRS processing module 825. UE 115-c may also include components for bi-directional voice and data communications including components for transmitting communications and components for receiving communications. For example, UE 115-c may communicate bi-directionally with base station 105-d or UE 115-d.

CRS processing module 825 may receive and process CRS or CSI-RS to identify CQI and other channel state information for inclusion in a combined report for one or more CCs.

UE 115-c may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-c may include a single antenna 840, UE 115-c may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor module 805 to perform various functions described herein (e.g., CSI reporting for eCA, etc.), or which may cause the processor to cause UE 115-c, or its components, to perform the functions described herein. Alternatively, the software/firmware code 820 may not be directly executable by the processor module 805 but cause a computer (e.g., when compiled and executed) to perform functions described herein. The processor module 805 may include an intelligent hardware device, (e.g., a central processing unit (CPU), a microcontroller, an ASIC, etc.)

Figure 9:
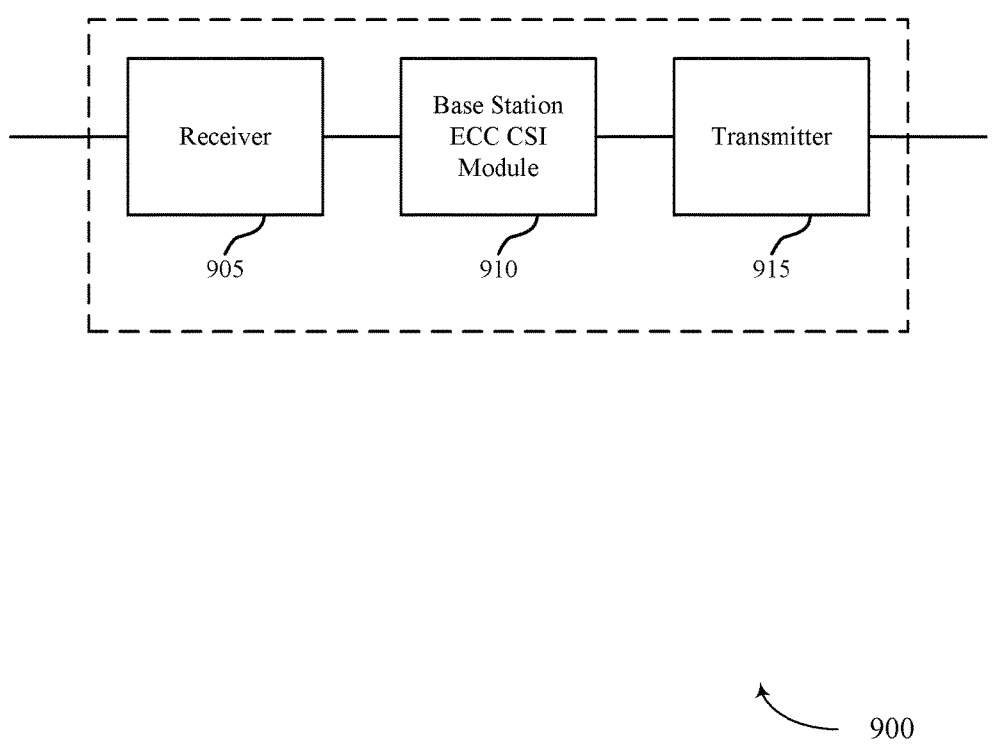
FIG. 9 shows a block diagram of a wireless device that supports CSI reporting for eCA in accordance with various aspects of the present disclosure.

FIG. 9 shows a block diagram of a wireless device 900 configured for CSI reporting for eCA in accordance with various aspects of the present disclosure. Wireless device 900 may be an example of aspects of a base station 105 described with reference to FIGS. 1-8. Wireless device 900 may include a receiver 905, a base station eCC CSI module 910, or a transmitter 915. Wireless device 900 may also include a processor. Each of these components may be in communication with one another.

The receiver 905 may receive information such as packets, user data, or control information associated with various information channels (e.g., control channels, data channels, and information related to CSI reporting for eCA, etc.). Information may be passed on to the base station eCC CSI module 910, and to other components of wireless device 900. In some examples, the receiver 905 may receive data using remaining resources of the PUSCH according to the semi-persistent scheduling configuration. In some examples, the receiver 905 may receive a signal on a PUCCH simultaneously to receiving one or more combined reports on a PUSCH.

The base station eCC CSI module 910 may establish a carrier aggregation configuration for a set of CCs, partition the set of CCs into several CSI reporting groups, and each CSI reporting group includes a plurality of CCs, configure each CSI reporting group with a CSI reporting configuration, and receive one or several combined reports corresponding to CSI reporting groups based on the corresponding CSI reporting configurations.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas.

Figure 10:
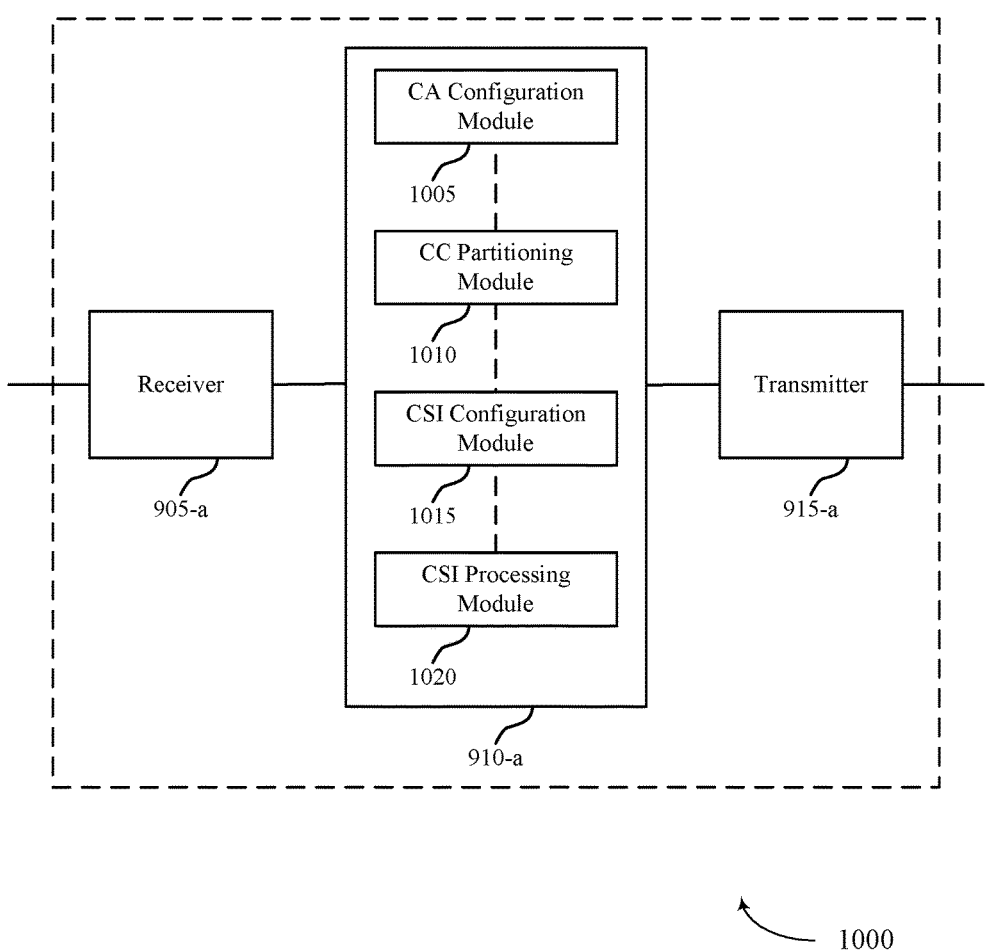
FIG. 10 shows a block diagram of a wireless device that supports CSI reporting for eCA in accordance with various aspects of the present disclosure.

FIG. 10 shows a block diagram of a wireless device 1000 for CSI reporting for eCA in accordance with various aspects of the present disclosure. Wireless device 1000 may be an example of aspects of a wireless device 900 or a base station 105 described with reference to FIGS. 1-9. Wireless device 1000 may include a receiver 905-a, a base station eCC CSI module 910-a, or a transmitter 915-a. Wireless device 1000 may also include a processor. Each of these components may be in communication with one another. The base station eCC CSI module 910-a may also include a CA configuration module 1005, a CC partitioning module 1010, a CSI configuration module 1015, and a CSI processing module 1020.

The receiver 905-a may receive information which may be passed on to base station eCC CSI module 910-a, and to other components of the device. The base station eCC CSI module 910-a may perform the operations described above with reference to FIG. 9. The transmitter 915-a may transmit signals received from other components of wireless device 1000.

The CA configuration module 1005 may establish a carrier aggregation configuration for a set of CCs as described above with reference to FIGS. 2-4.

The CC partitioning module 1010 may partition the set of CCs into CSI reporting groups, and each CSI reporting group may include a number of CCs as described above with reference to FIGS. 2-4. In some examples, partitioning the set of CCs includes selecting a plurality of CCs for each CSI reporting group based on a set of reporting types. In some examples, partitioning the set of CCs includes selecting a plurality of CCs for each CSI reporting group based on a CSI reporting periodicity. In some examples, each CC from the set of CC may be in a CSI reporting group of the plurality of CSI reporting groups.

The CSI configuration module 1015 may configure each CSI reporting group with a CSI reporting configuration as described above with reference to FIGS. 2-4. In some examples, each of the CSI reporting configurations includes a CSI reporting periodicity.

The CSI processing module 1020 may receive one or more combined reports corresponding to CSI reporting groups based on the corresponding CSI reporting configurations as described above with reference to FIGS. 2-4. In some examples, each of the combined reports includes CSI information for each of the plurality of CCs in a corresponding CSI reporting group. In some examples, each of the one or more combined reports include a multiplexed set of individual CSI reports corresponding to the plurality of CCs in the CSI reporting group, and each of the individual CSI reports may be based at least part on an individual PUCCH format. In some examples, the individual PUCCH format may be a PUCCH format 3. In some examples, the one or more combined reports are received on a first UL control channel. The CSI processing module 1020 may also receive a second CSI report on a second UL control channel on a different CC than the first UL control channel. In some examples, receiving the one or more combined reports is based on the CSI reporting periodicity.

The components of wireless devices 900 and 1000 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 11:
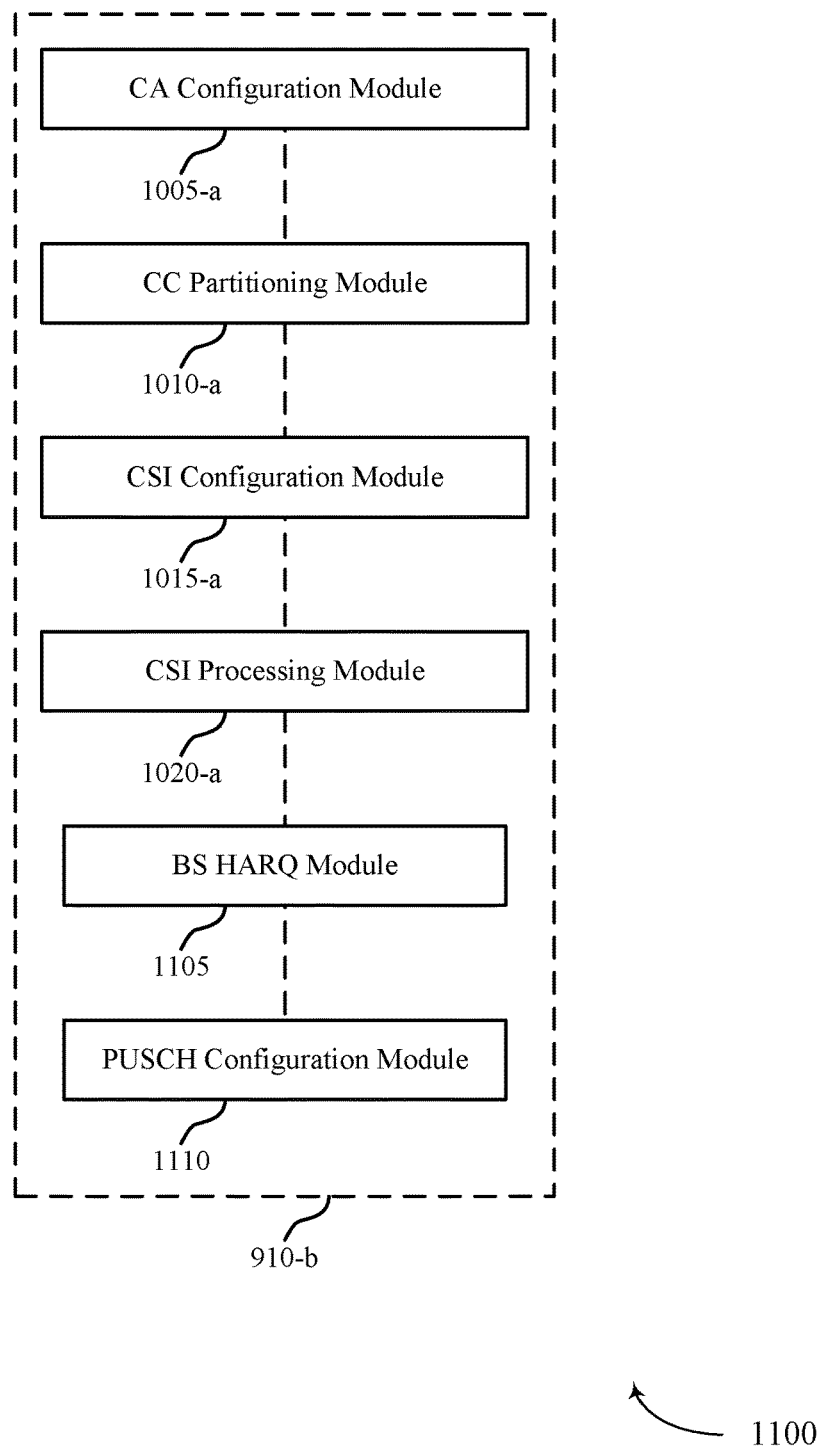
FIG. 11 shows a block diagram of a wireless device that supports CSI reporting for eCA in accordance with various aspects of the present disclosure.

FIG. 11 shows a block diagram 1100 of a base station eCC CSI module 910-b which may be a component of a wireless device 900 or a wireless device 1000 for CSI reporting for eCA in accordance with various aspects of the present disclosure. The base station eCC CSI module 910-b may be an example of aspects of a base station eCC CSI module 910 described with reference to FIGS. 9-10. The base station eCC CSI module 910-b may include a CA configuration module 1005-a, a CC partitioning module 1010-a, a CSI configuration module 1015-a, and a CSI processing module 1020-a. Each of these modules may perform the functions described above with reference to FIG. 10. The base station eCC CSI module 910-b may also include a BS HARQ module 1105, and a PUSCH configuration module 1110.

The components of the base station eCC CSI module 910-b may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The BS HARQ module 1105 may be configured identify and utilize combined reports that include HARQ feedback as described above with reference to FIGS. 2-4.

The PUSCH configuration module 1110 may be configured to receive combined reports based on a PUSCH using a semi-persistent scheduling configuration as described above with reference to FIGS. 2-4. In some examples, combined reports are jointly coded. The PUSCH configuration module 1110 may also select the semi-persistent scheduling configuration for the PUSCH based on a periodicity of the combined reports.

Figure 12:
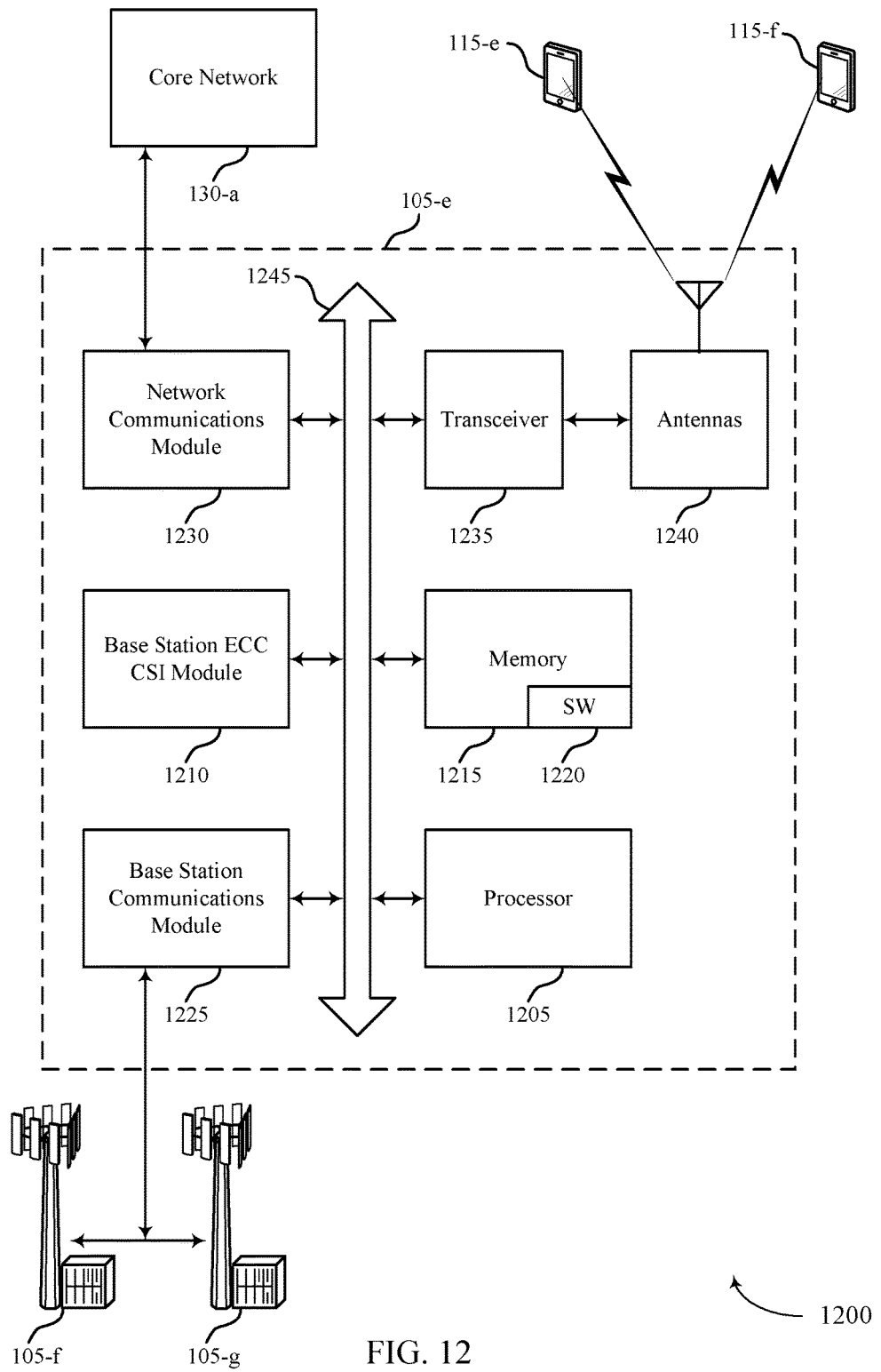
FIG. 12 illustrates a block diagram of a system including a base station that supports CSI reporting for eCA in accordance with various aspects of the present disclosure.

FIG. 12 shows a diagram of a system 1200 including a base station 105 configured for CSI reporting for eCA in accordance with various aspects of the present disclosure. System 1200 may include base station 105-e, which may be an example of wireless device 900, a wireless device 1000, or a base station 105 described above with reference to FIGS. 1, 2 and 9-11. Base Station 105-e may include a base station eCC CSI module 1210, which may be an example of base station eCC CSI module 910 described with reference to FIGS. 9-11. Base Station 105-e may also include components for bi-directional voice and data communications including components for transmitting communications and components for receiving communications. For example, base station 105-e may communicate bi-directionally with UE 115-e or UE 115-f.

In some cases, base station 105-e may have one or more wired backhaul links. Base station 105-e may have a wired backhaul link (e.g., S1 interface, etc.) to the core network 130. Base station 105-e may also communicate with other base stations 105, such as base station 105-f and base station 105-g via inter-base station backhaul links (e.g., an X2 interface). Each of the base stations 105 may communicate with UEs 115 using the same or different wireless communications technologies. In some cases, base station 105-e may communicate with other base stations such as 105-f or 105-g utilizing base station communication module 1225. In some examples, base station communication module 1225 may provide an X2 interface within an LTE/LTE-A wireless communication network technology to provide communication between some of the base stations 105. In some examples, base station 105-e may communicate with other base stations through core network 130. In some cases, base station 105-e may communicate with the core network 130 through network communications module 1230.

The base station 105-e may include a processor module 1205, memory 1215 (including software (SW) 1220), transceiver modules 1235, and antenna(s) 1240, which each may be in communication, directly or indirectly, with one another (e.g., over bus system 1245). The transceiver modules 1235 may be configured to communicate bi-directionally, via the antenna(s) 1240, with the UEs 115, which may be multi-mode devices. The transceiver module 1235 (or other components of the base station 105-e) may also be configured to communicate bi-directionally, via the antennas 1240, with one or more other base stations (not shown). The transceiver module 1235 may include a modem configured to modulate the packets and provide the modulated packets to the antennas 1240 for transmission, and to demodulate packets received from the antennas 1240. The base station 105-e may include multiple transceiver modules 1235, each with one or more associated antennas 1240. The transceiver module may be an exemplary combined receiver 905 and transmitter 915 of FIG. 9.

The memory 1215 may include RAM and ROM. The memory 1215 may also store computer-readable, computer-executable software code 1220 containing instructions that are configured to, when executed, cause the processor module 1210 to perform various functions described herein (e.g., CSI reporting for eCA, selecting coverage enhancement techniques, call processing, database management, message routing, etc.), or may cause the processor to cause base station 105-c, or its components, to perform functions described herein. Alternatively, the software 1220 may not be directly executable by the processor module 1205 but be configured to cause the computer, e.g., when compiled and executed, to perform functions described herein. The processor module 1205 may include an intelligent hardware device, e.g., a CPU, a microcontroller, an ASIC, etc. The processor module 1205 may include various special purpose processors such as encoders, queue processing modules, base band processors, radio head controllers, digital signal processor (DSPs), and the like.

The base station communications module 1225 may manage communications with other base stations 105. The communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

Figure 13:
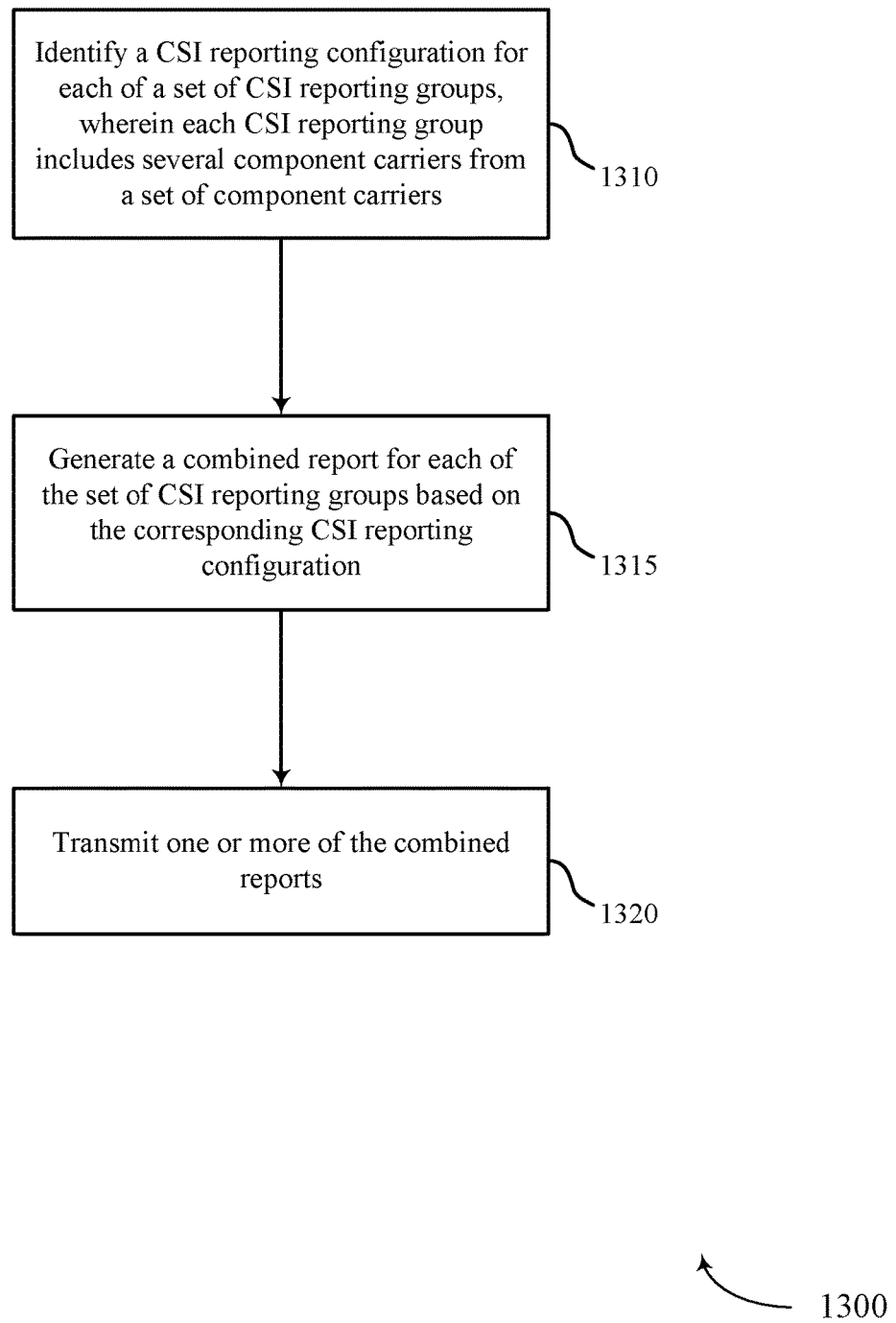
FIG. 13 illustrates a method for CSI reporting for eCA in accordance with various aspects of the present disclosure.

FIG. 13 shows a flowchart illustrating a method 1300 for CSI reporting for eCA in accordance with various aspects of the present disclosure. The operations of method 1300 may be implemented by a UE 115 or its components as described with reference to FIGS. 1-8. For example, the operations of method 1300 may be performed by the eCC CSI module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1310, the UE 115 may identify a CSI reporting configuration for each of a plurality of CSI reporting groups, and each CSI reporting group includes a plurality of CCs from a set of CCs as described above with reference to FIGS. 2-4. In certain examples, the operations of block 1310 may be performed by the CSI grouping module 610 as described above with reference to FIG. 6.

At block 1315, the UE 115 may generate a combined report for each of the plurality of CSI reporting groups based on the corresponding CSI reporting configuration as described above with reference to FIGS. 2-4. In certain examples, the operations of block 1315 may be performed by the combined report module 615 as described above with reference to FIG. 6.

At block 1320, the UE 115 may transmit one or more of the combined reports as described above with reference to FIGS. 2-4. In certain examples, the operations of block 1320 may be performed by the transmitter 515 as described above with reference to FIG. 5.

Figure 14:
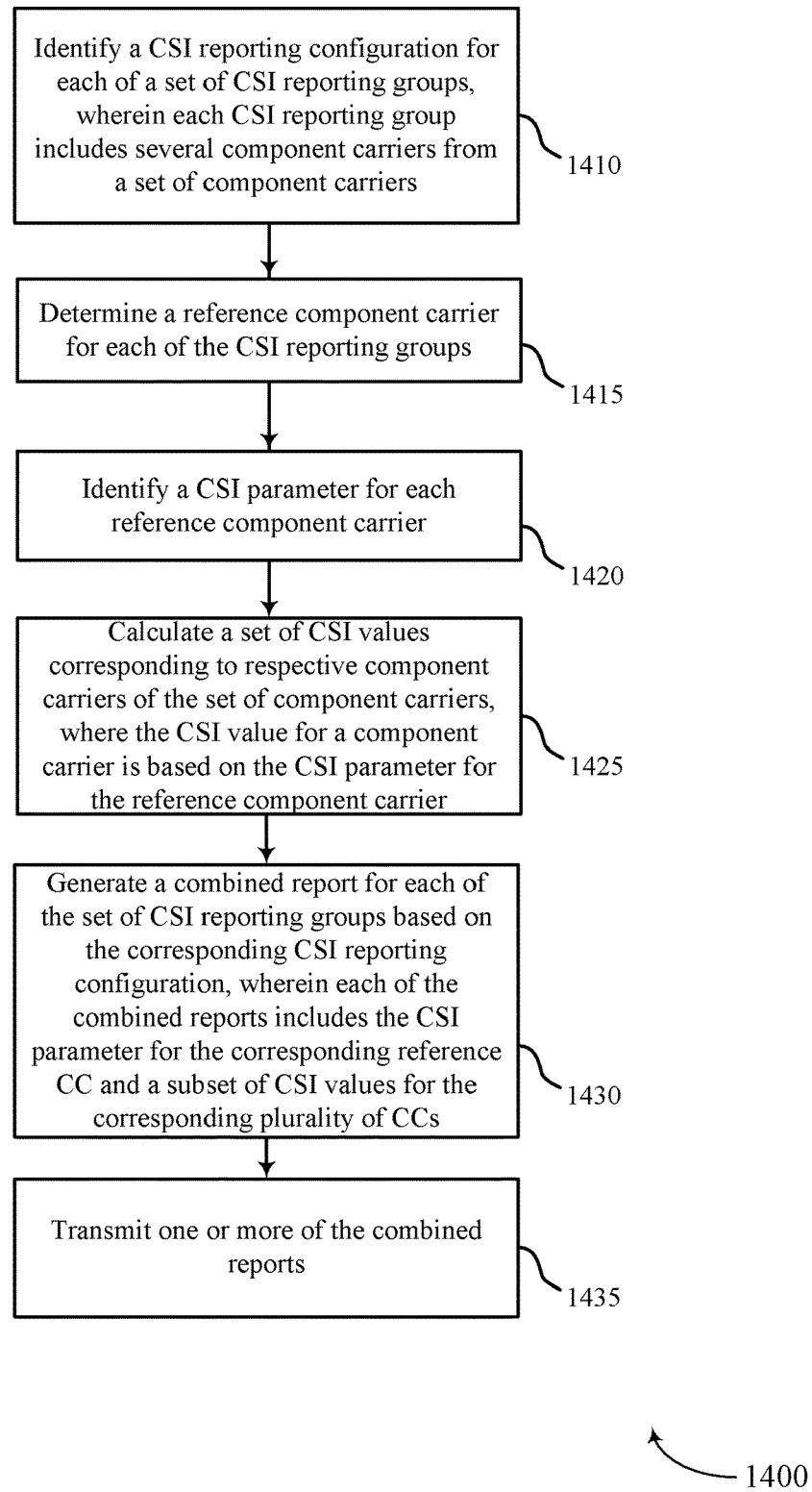
FIG. 14 illustrates a method for CSI reporting for eCA in accordance with various aspects of the present disclosure.

FIG. 14 shows a flowchart illustrating a method 1400 for CSI reporting for eCA in accordance with various aspects of the present disclosure. The operations of method 1400 may be implemented by a UE 115 or its components as described with reference to FIGS. 1-8. For example, the operations of method 1400 may be performed by the eCC CSI module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1410, the UE 115 may identify a CSI reporting configuration for each of a plurality of CSI reporting groups, and each CSI reporting group includes a plurality of CCs from a set of CCs as described above with reference to FIGS. 2-4. In certain examples, the operations of block 1410 may be performed by the CSI grouping module 610 as described above with reference to FIG. 6.

At block 1415, the UE 115 may select a reference CC for each of the CSI reporting groups as described above with reference to FIGS. 2-4. In certain examples, the operations of block 1415 may be performed by the CSI delta module 705 as described above with reference to FIG. 7.

At block 1420, the UE 115 may identify a CSI parameter for each of the reference CCs as described above with reference to FIGS. 2-4. In certain examples, the operations of block 1420 may be performed by the CSI module 710 as described above with reference to FIG. 7.

At block 1425, the UE 115 may calculate a set of CSI delta values corresponding to each CC of the set of CCs except for the reference CCs as described above with reference to FIGS. 2-4. In certain examples, the operations of block 1425 may be performed by the CSI delta module 705 as described above with reference to FIG. 7.

At block 1430, the UE 115 may generate a combined report for each of the plurality of CSI reporting groups based on the corresponding CSI reporting configuration as described above with reference to FIGS. 2-4. In some cases, each of the combined reports includes the CSI parameter for the corresponding reference CC and a subset of CSI delta values for the corresponding plurality of CCs. In certain examples, the operations of block 1430 may be performed by the combined report module 615 as described above with reference to FIG. 6.

At block 1435, the UE 115 may transmit one or more of the combined reports as described above with reference to FIGS. 2-4. In certain examples, the operations of block 1435 may be performed by the transmitter 515 as described above with reference to FIG. 5.

Figure 15:
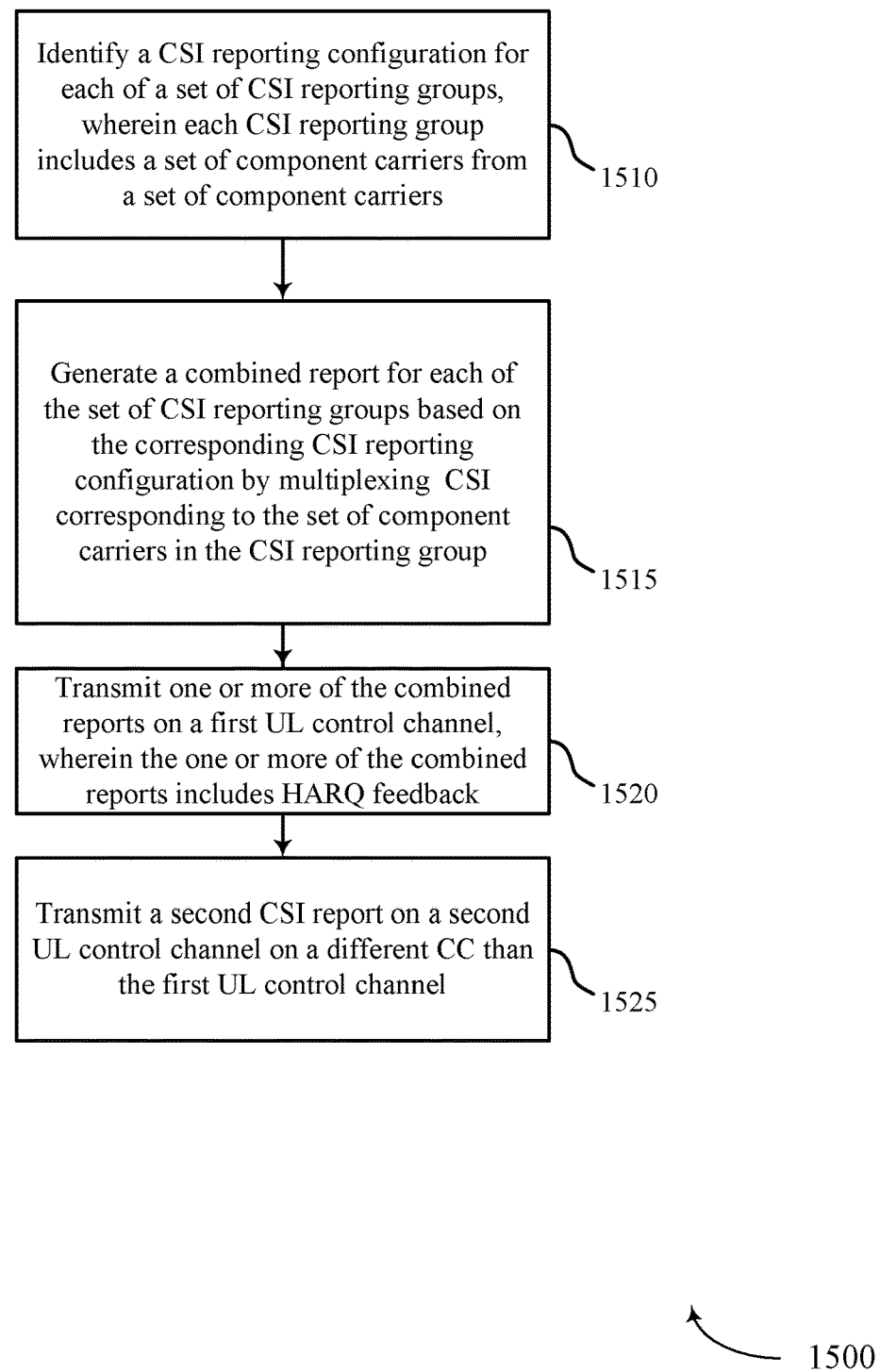
FIG. 15 illustrates a method for CSI reporting for eCA in accordance with various aspects of the present disclosure.

FIG. 15 shows a flowchart illustrating a method 1500 for CSI reporting for eCA in accordance with various aspects of the present disclosure. The operations of method 1500 may be implemented by a UE 115 or its components as described with reference to FIGS. 1-8. For example, the operations of method 1500 may be performed by the eCC CSI module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300 or 1400 of FIGS. 13 and 14.

At block 1510, the UE 115 may identify a CSI reporting configuration for each of a plurality of CSI reporting groups, and each CSI reporting group includes a plurality of CCs from a set of CCs as described above with reference to FIGS. 2-4. In certain examples, the operations of block 1510 may be performed by the CSI grouping module 610 as described above with reference to FIG. 6.

At block 1515, the UE 115 may generate a combined report for each of the plurality of CSI reporting groups based on the corresponding CSI reporting configuration as described above with reference to FIGS. 2-4. In some cases, generating the combined report for each of the plurality of CSI reporting groups includes: multiplexing a set of individual CSI reports corresponding to the plurality of CCs in the CSI reporting group, and each of the individual CSI reports is based at least part on an individual PUCCH format. In some cases, the one or more of the combined reports includes HARQ feedback. In certain examples, the operations of block 1515 may be performed by the combined report module 615 as described above with reference to FIG. 6.

At block 1520, the UE 115 may transmit one or more of the combined reports as described above with reference to FIGS. 2-4. In some cases, transmitting the one or more of the combined reports includes: transmitting the one or more of the combined reports on a first UL control channel. In certain examples, the operations of block 1520 may be performed by the transmitter 515 as described above with reference to FIG. 5.

At block 1525, the UE 115 may transmit a second CSI report on a second UL control channel on a different CC than the first UL control channel as described above with reference to FIGS. 2-4. In certain examples, the operations of block 1525 may be performed by the transmitter 515 as described above with reference to FIG. 5.

Figure 16:
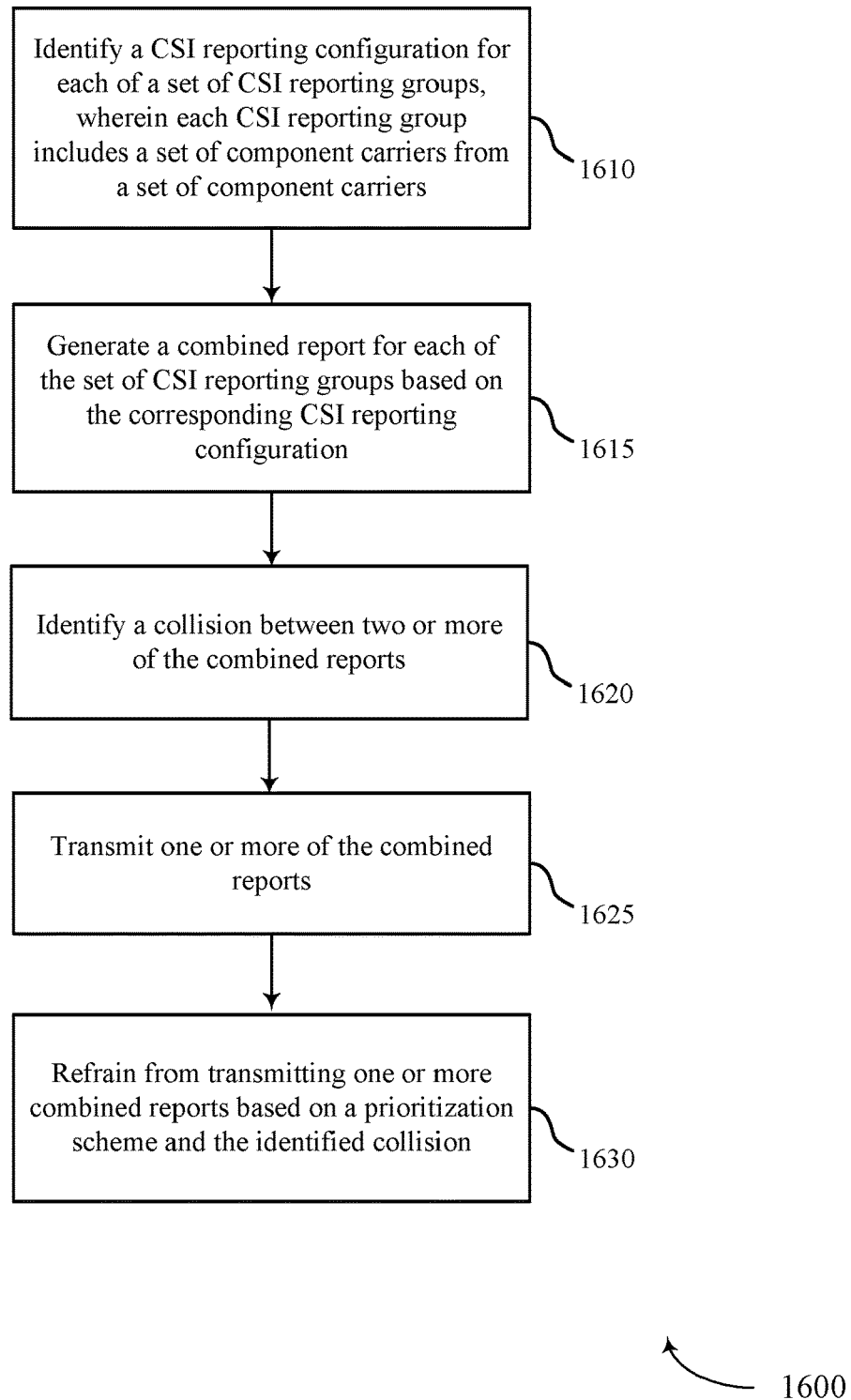
FIG. 16 illustrates a method for CSI reporting for eCA in accordance with various aspects of the present disclosure.

FIG. 16 shows a flowchart illustrating a method 1600 for CSI reporting for eCA in accordance with various aspects of the present disclosure. The operations of method 1600 may be implemented by a UE 115 or its components as described with reference to FIGS. 1-8. For example, the operations of method 1600 may be performed by the eCC CSI module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1300, 1400, or 1500 of FIGS. 13-15.

At block 1610, the UE 115 may identify a CSI reporting configuration for each of a plurality of CSI reporting groups, and each CSI reporting group includes a plurality of CCs from a set of CCs as described above with reference to FIGS. 2-4. In certain examples, the operations of block 1610 may be performed by the CSI grouping module 610 as described above with reference to FIG. 6.

At block 1615, the UE 115 may generate a combined report for each of the plurality of CSI reporting groups based on the corresponding CSI reporting configuration as described above with reference to FIGS. 2-4. In certain examples, the operations of block 1615 may be performed by the combined report module 615 as described above with reference to FIG. 6.

At block 1620, the UE 115 may identify a collision between two or more of the combined reports as described above with reference to FIGS. 2-4. In certain examples, the operations of block 1620 may be performed by the collision resolution module 730 as described above with reference to FIG. 7.

At block 1625, the UE 115 may transmit one or more of the combined reports as described above with reference to FIGS. 2-4. In certain examples, the operations of block 1625 may be performed by the transmitter 515 as described above with reference to FIG. 5.

At block 1630, the UE 115 may refrain from transmitting at least one of the two or more combined reports based on a prioritization scheme and the identified collision as described above with reference to FIGS. 2-4. In certain examples, the operations of block 1630 may be performed by the collision resolution module 730 as described above with reference to FIG. 7.

Figure 17:
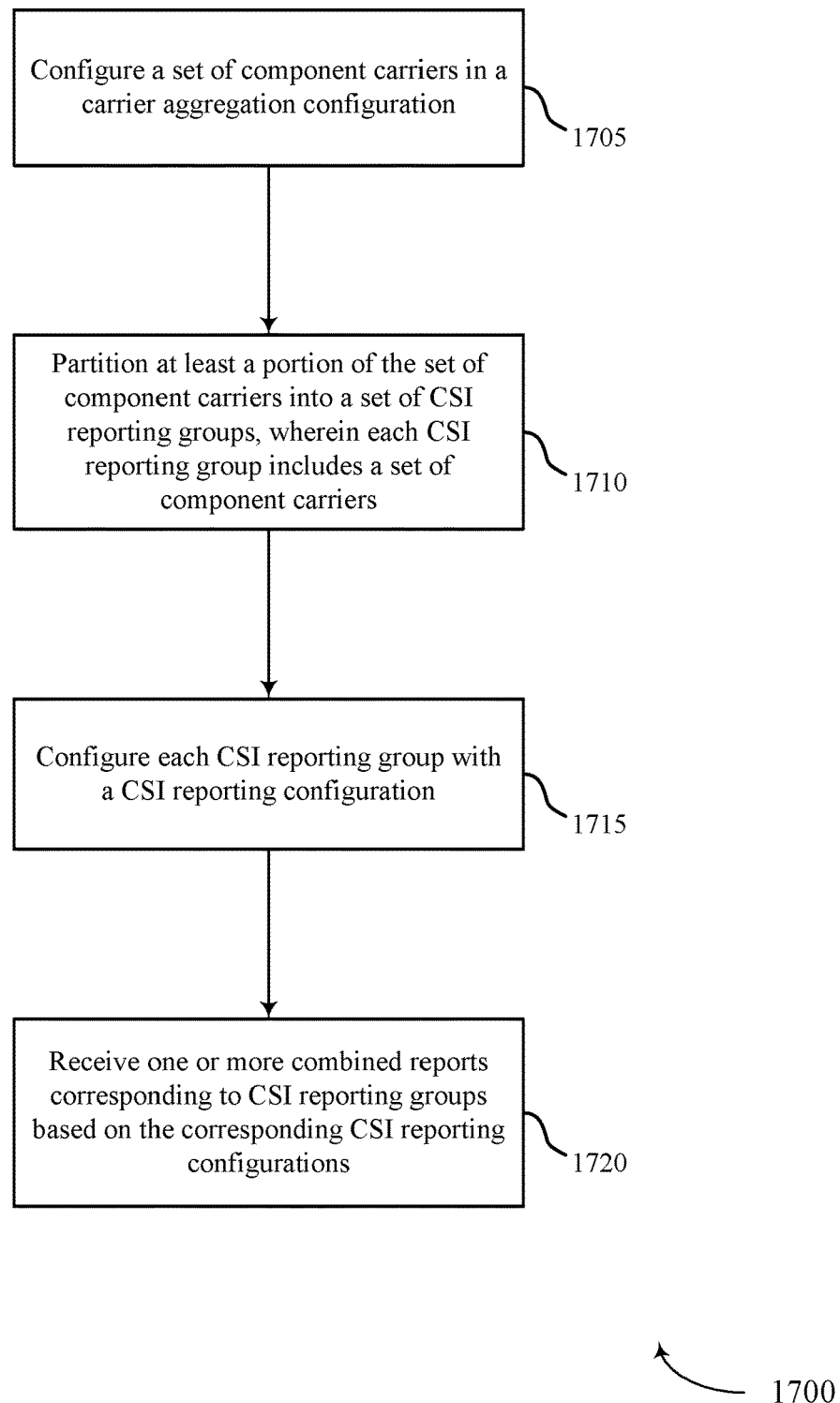
FIG. 17 illustrates a method for CSI reporting for eCA in accordance with various aspects of the present disclosure.

FIG. 17 shows a flowchart illustrating a method 1700 for CSI reporting for eCA in accordance with various aspects of the present disclosure. The operations of method 1700 may be implemented by a base station 105 or its components as described with reference to FIGS. 1-7, and 9-12. For example, the operations of method 1700 may be performed by the base station eCC CSI module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1705, the base station 105 may establish a carrier aggregation configuration for a set of CCs as described above with reference to FIGS. 2-4. In certain examples, the operations of block 1705 may be performed by the CA configuration module 1005 as described above with reference to FIG. 10.

At block 1710, the base station 105 may partition at least a portion of the set of CCs into a plurality of CSI reporting groups, and each CSI reporting group includes a plurality of CCs as described above with reference to FIGS. 2-4. In certain examples, the operations of block 1710 may be performed by the CC partitioning module 1010 as described above with reference to FIG. 10.

At block 1715, the base station 105 may configure each CSI reporting group with a CSI reporting configuration as described above with reference to FIGS. 2-4. In certain examples, the operations of block 1715 may be performed by the CSI configuration module 1015 as described above with reference to FIG. 10.

At block 1720, the base station 105 may receive one or more combined reports corresponding to CSI reporting groups based on the corresponding CSI reporting configurations as described above with reference to FIGS. 2-4. In certain examples, the operations of block 1720 may be performed by the CSI processing module 1020 as described above with reference to FIG. 10.

Figure 18:
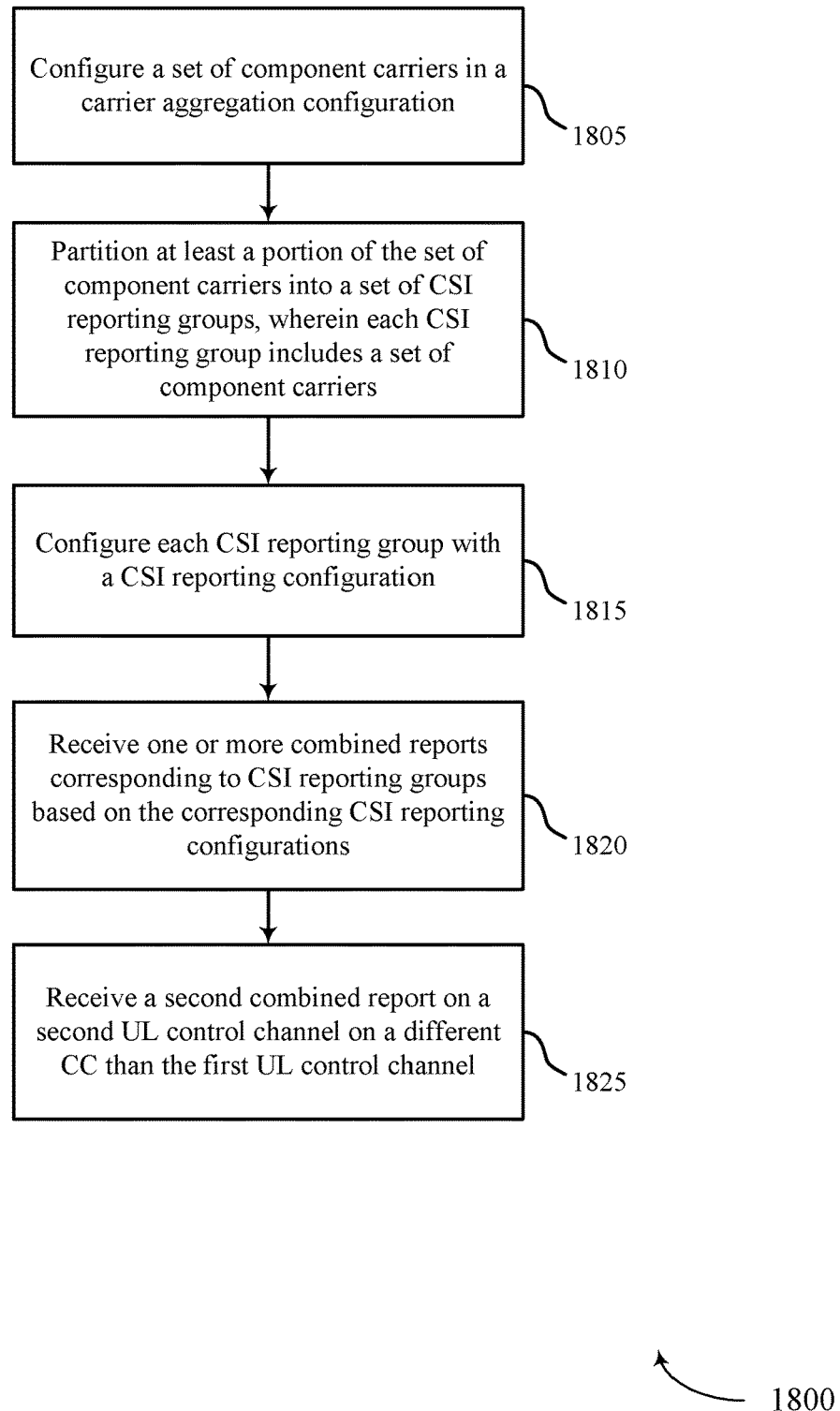
FIG. 18 illustrates a method for CSI reporting for eCA in accordance with various aspects of the present disclosure.

FIG. 18 shows a flowchart illustrating a method 1800 for CSI reporting for eCA in accordance with various aspects of the present disclosure. The operations of method 1800 may be implemented by a base station 105 or its components as described with reference to FIGS. 1-7, and 9-12. For example, the operations of method 1800 may be performed by the base station eCC CSI module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of method 1700 of FIG. 17.

At block 1805, the base station 105 may establish a carrier aggregation configuration for a set of CCs as described above with reference to FIGS. 2-4. In certain examples, the operations of block 1805 may be performed by the CA configuration module 1005 as described above with reference to FIG. 10.

At block 1810, the base station 105 may partition at least a portion of the set of CCs into a plurality of CSI reporting groups, and each CSI reporting group includes a plurality of CCs as described above with reference to FIGS. 2-4. In certain examples, the operations of block 1810 may be performed by the CC partitioning module 1010 as described above with reference to FIG. 10.

At block 1815, the base station 105 may configure each CSI reporting group with a CSI reporting configuration as described above with reference to FIGS. 2-4. In certain examples, the operations of block 1815 may be performed by the CSI configuration module 1015 as described above with reference to FIG. 10.

At block 1820, the base station 105 may receive one or more combined reports corresponding to CSI reporting groups based on the corresponding CSI reporting configurations as described above with reference to FIGS. 2-4. In some cases, receiving the one or more combined reports includes: receiving a multiplexed set of individual CSI reports corresponding to the plurality of CCs in the CSI reporting group, and each of the individual CSI reports is based at least part on an individual PUCCH format. In some cases, the one or more of the combined reports includes HARQ feedback. In some cases, receiving the one or more of the combined reports includes: receiving the one or more of the combined reports on an UL control channel. In certain examples, the operations of block 1820 may be performed by the CSI processing module 1020 as described above with reference to FIG. 10.

At block 1825, the base station 105 may receive a second CSI report on a second UL control channel on a different CC than the first UL control channel as described above with reference to FIGS. 2-4. In certain examples, the operations of block 1825 may be performed by the CSI processing module 1020 as described above with reference to FIG. 10.

Thus, methods 1300, 1400, 1500, 1600, 1700, and 1800 may provide for CSI reporting for eCA. It should be noted that methods 1300, 1400, 1500, 1600, 1700, and 1800 describe possible implementation, and that the operations and the steps may be rearranged or otherwise modified such that other implementations are possible. In some examples, aspects from two or more of the methods 1300, 1400, 1500, 1600, 1700, and 1800 may be combined.

The detailed description set forth above in connection with the appended drawings describes exemplary configurations and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication by a user equipment (UE), comprising:
   identifying, by the UE, a channel state information (CSI) reporting configuration for each of a plurality of CSI reporting groups, wherein each CSI reporting group comprises a plurality of component carriers (CCs) from a set of component carriers in a carrier aggregation configuration of the UE;
   determining, by the UE, CSI values for one or more CSI reporting groups, wherein the CSI values correspond to carriers in the plurality of CCs for the one or more CSI reporting groups, and wherein the CSI values for a CSI reporting group in the one or more CSI reporting groups include a CSI parameter for a reference component carrier and delta values based on the CSI parameter for the reference component carrier;
   generating, by the UE, a combined report for each of the one or more CSI reporting groups based at least in part on the corresponding CSI reporting configuration, the combined reports each including the corresponding CSI values for a CSI reporting group in the one or more CSI reporting groups; and
   transmitting, by the UE, one or more of the combined reports.

2. The method of claim 1, further comprising:
   determining a reference component carrier for each of the CSI reporting groups; and
   identifying a CSI parameter for each reference component carrier.

3. The method of claim 1, wherein each component carrier from the set of component carriers is associated with a CSI reporting group of the plurality of CSI reporting groups.

4. The method of claim 1, wherein generating the combined report for each of the plurality of CSI reporting groups comprises:
   multiplexing a plurality of CSI reports corresponding to the plurality of component carriers in the CSI reporting group, wherein each CSI report in the plurality of CSI reports is based at least part on an individual physical uplink control channel (PUCCH) format.

5. The method of claim 4, wherein the transmitting further comprises:
   transmitting hybrid automatic repeat request (HARQ) feedback with a first combined report on a first uplink (UL) control channel of a first UL component carrier; and
   transmitting remaining combined reports on a second UL control channel of a second UL component carrier.

6. The method of claim 1, wherein transmitting the one or more of the combined reports comprises:
   transmitting the one or more combined reports on a physical uplink shared channel (PUSCH) according to a semi-persistent scheduling configuration of the UE.

7. The method of claim 6, wherein at least one of the combined reports comprises at least one of HARQ feedback or a scheduling request (SR), or both.

8. The method of claim 7, further comprising:
   sending an indication that the at least one of the combined reports comprises HARQ feedback.

9. The method of claim 7, wherein the one or more combined reports are jointly coded.

10. The method of claim 6, further comprising:
    transmitting data using remaining resources of the PUSCH according to the semi-persistent scheduling configuration of the UE.

11. The method of claim 1, wherein each of the CSI reporting configurations comprises a CSI reporting periodicity, and wherein transmitting the one or more combined reports comprises:
    transmitting the one or more combined reports based at least in part on the CSI reporting periodicity.

12. The method of claim 1, further comprising:
    identifying a collision between two or more of the combined reports; and
    refraining from transmitting at least one of the two or more combined reports based at least in part on a prioritization scheme and when the collision is identified.

13. The method of claim 12, wherein the prioritization scheme is based at least in part on a set of reporting types, and wherein each component carrier of the plurality of component carriers in each CSI reporting group has a same reporting type.

14. The method of claim 13, wherein the prioritization scheme is further based at least in part on a lowest serving cell index.

15. An apparatus for wireless communication, comprising:
    means for identifying, by the apparatus, a carrier aggregation configuration comprising a set of component carriers (CCs);
    means for identifying, by the apparatus, a channel state information (CSI) reporting configuration for each of a plurality of CSI reporting groups, wherein each CSI reporting group comprises a plurality of component carriers from the set of component carriers in the carrier aggregation configuration;
    means for determining, by the apparatus, a reference component carrier for each of the CSI reporting groups;
    means for identifying, by the apparatus, a CSI parameter for each reference component carrier;
    means for determining, by the apparatus, CSI values for one or more CSI reporting groups, wherein the CSI values correspond to carriers in the plurality of CCs for the one or more CSI reporting groups, and wherein the CSI values for a CSI reporting group in the one or more CSI reporting groups include the CSI parameter for the reference component carrier and delta values based on the CSI parameter for the reference component carrier;
    means for generating, by the apparatus, a combined report for each of the one or more CSI reporting groups based at least in part on the corresponding CSI reporting configuration, the combined reports each including the corresponding CSI values for a CSI reporting group in the one or more CSI reporting groups; and
    means for transmitting, by the apparatus, one or more of the combined reports.

16. An apparatus for wireless communication, comprising:
    at least one processor;
    memory in electronic communication with the at least one processor; and instructions stored in the memory and operable, when executed by the at least one processor, to cause the apparatus to:

identify, by the apparatus, a carrier aggregation configuration comprising a set of component carriers (CCs);

identify, by the apparatus, a channel state information (CSI) reporting configuration for each of a plurality of CSI reporting groups, wherein each CSI reporting group comprises a plurality of component carriers from the set of component carriers in the carrier aggregation configuration;

determine, by the apparatus, CSI values for one or more CSI reporting groups, wherein the CSI values correspond to carriers in the plurality of CCs for the one or more CSI reporting groups, and wherein the CSI values for a CSI reporting group in the one or more CSI reporting groups include a CSI parameter for a reference component carrier and delta values based on the CSI parameter for the reference component carrier;

generate, by the apparatus, a combined report for each of the one or more CSI reporting groups based at least in part on the corresponding CSI reporting configuration, the combined reports each including the corresponding CSI values for a CSI reporting group in the one or more CSI reporting groups; and transmit, by the apparatus, one or more of the combined reports.

17. The apparatus of claim 16, wherein the instructions are operable to cause the apparatus to:

select a reference component carrier for each of the CSI reporting groups; and identify a CSI parameter for each of the reference component carriers.

18. The apparatus of claim 16, wherein the instructions are operable to cause the apparatus to:

multiplex a plurality of CSI reports corresponding to the plurality of component carriers in the CSI reporting group, wherein each CSI report in the plurality of CSI reports is based at least part on an individual physical uplink control channel (PUCCH) format.

19. The apparatus of claim 18, wherein the instructions are operable to cause the apparatus to:

transmit the one or more of the combined reports on a first uplink (UL) control channel; and transmit remaining combined reports on a second UL control channel on a different component carrier (CC) than the first UL control channel.

20. The apparatus of claim 16, wherein the instructions are operable to cause the apparatus to:

transmit the one or more of the combined reports on a physical uplink shared channel (PUSCH) according to a semi-persistent scheduling configuration.

21. The apparatus of claim 20, wherein the instructions are operable to cause the apparatus to:

transmit data using remaining resources of the PUSCH according to the semi-persistent scheduling configuration.

22. The apparatus of claim 16, wherein each of the CSI reporting configurations comprises a CSI reporting periodicity, and wherein the instructions are operable to cause the apparatus to:

transmit the one or more combined reports based at least in part on the CSI reporting periodicity.

23. The apparatus of claim 16, wherein the instructions are operable to cause the apparatus to:

identify a collision between two or more of the combined reports; and refrain from transmitting at least one of the two or more combined reports based at least in part on a prioritization scheme and the identified collision.

* * * * *